United States Patent
Tsuruoka

(10) Patent No.: US 7,570,291 B2
(45) Date of Patent: Aug. 4, 2009

(54) IMAGING SYSTEM AND IMAGE PROCESSING PROGRAM

(75) Inventor: Takao Tsuruoka, Machida (JP)

(73) Assignee: Olympus Corporation, Tokyo (JP)

( * ) Notice: Subject to any disclaimer, the term of this patent is extended or adjusted under 35 U.S.C. 154(b) by 713 days.

(21) Appl. No.: 10/543,079

(22) PCT Filed: Jan. 20, 2004

(86) PCT No.: PCT/JP2004/000395

§ 371 (c)(1),
(2), (4) Date: Jul. 21, 2005

(87) PCT Pub. No.: WO2004/066637

PCT Pub. Date: Aug. 5, 2004

(65) Prior Publication Data

US 2006/0132629 A1    Jun. 22, 2006

(30) Foreign Application Priority Data

Jan. 22, 2003   (JP) .............................. 2003-013863

(51) Int. Cl.
*H04N 9/083* (2006.01)
*G06K 9/20* (2006.01)
(52) U.S. Cl. .................. 348/277; 348/280; 382/300
(58) Field of Classification Search .......... 348/280, 348/241, 260–274, 163, 208.4; 382/300
See application file for complete search history.

(56) References Cited

U.S. PATENT DOCUMENTS 5,506,619 A * 4/1996 Adams et al. ............... 348/272
5,552,827 A * 9/1996 Maenaka et al. ............ 348/266
6,091,862 A * 7/2000 Okisu ....................... 382/300
7,015,961 B2 * 3/2006 Kakarala ................... 348/246
7,053,944 B1 * 5/2006 Acharya et al. ............ 348/273
2002/0140833 A1   10/2002 Hirai

FOREIGN PATENT DOCUMENTS

JP       2000-151989 A       5/2000

* cited by examiner

*Primary Examiner*—Nhan T Tran
*Assistant Examiner*—Mekonnen Dagnew
(74) *Attorney, Agent, or Firm*—Frishauf, Holtz, Goodman & Chick, P.C.

(57) ABSTRACT

The image pickup system of the present invention is an image pickup system for processing an image signal at each pixel which is composed of more than one color signals and one or more of the color signals are dropped out according to the location of the pixel, comprising a first interpolating unit for interpolating the color signals dropped-out from the image signals by a first interpolation method based on the edge detection, a verifying unit for verifying the interpolation precision on the basis of the image signals and the color signals interpolated by the first interpolating unit, and a second interpolating unit for interpolating the color signals dropped-out from the image signals by a second interpolation method based on the color correlation that is different from the first interpolation method in cases where it is judged that the interpolation precision by the first interpolation method is insufficient.

32 Claims, 18 Drawing Sheets

| R | G |
|---|---|
| G | B |

(B)

| R | G | R | G | R | G | R | G |
|---|---|---|---|---|---|---|---|
| G | B | G | B | G | B | G | B |
| R | G | R | G | R | G | | |
| G | B | G | B | G | B | | |
| R | G | R | G | R | G | | |
| G | B | G | B | G | B | | |
| R | G | | | | | | |
| G | B | | | | | | |

FIG.4

(A) PIXEL LAYOUT OF EXTRACTED BLOCK

| R00 | G10 | R20 | G30 | R40 | G50 |
|-----|-----|-----|-----|-----|-----|
| G01 | B11 | G21 | B31 | G41 | B51 |
| R02 | G12 | R22 | G32 | R42 | G52 |
| G03 | B13 | G23 | B33 | G43 | B53 |
| R04 | G14 | R24 | G34 | R44 | G54 |
| G05 | B15 | G25 | B35 | G45 | B55 |

(B) G INTERPOLATION (R22 POSITION)

Center row: R02, G12, R22, G32, R42
Column around R22: R20, G21, G23, R24

(C) G INTERPOLATION (B33 VALUE)

Center row: B13, G23, B33, G43, B53
Column around B33: B31, G32, G34, B35

(D) R,B INTERPOLATION (G23 VALUE)

Surrounding pixels: B11/G11, B31/G31, R02/G02, R22/G22, R42/G42, B13/G13, G23, B33/G33, R04/G04, R24/G24, R44/G44, B15/G15, B35/G35

(E) R,B INTERPOLATION (G32 VALUE)

Surrounding pixels: R20/G20, R40/G40, B11/G11, B31/G31, B51/G51, R22/G22, G32, R42/G42, B13/G13, B33/G33, B53/G53, R24/G24, R44/G44

(F) R,B INTERPOLATION (R22 POSITION)

Surrounding pixels: B11/G11, B31/G31, R22/G22, B13/G13, B33/G33

(G) R,B INTERPOLATION (B33 POSITION)

Surrounding pixels: R22/G22, R42/G42, B33/G33, R24/G24, R44/G44

FIG.6
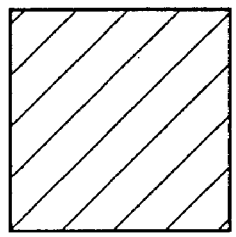
(A) SINGLE HUE INPUT IMAGE
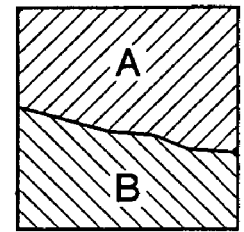
(C) MULTI-HUE INPUT IMAGE
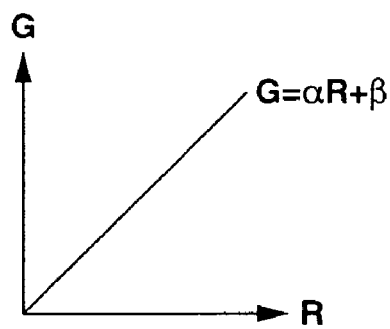
(B) REGRESSION TO
SINGLE HUE LINEAR TYPE
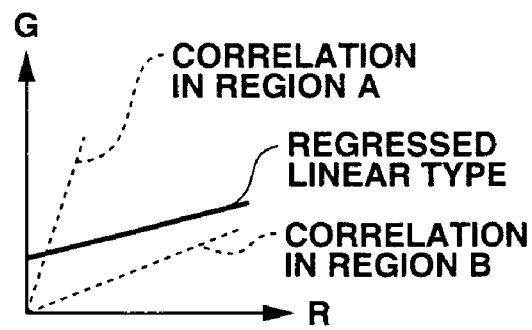
(D) REGRESSION TO
MULTI-HUE LINEAR TYPE FIG.10
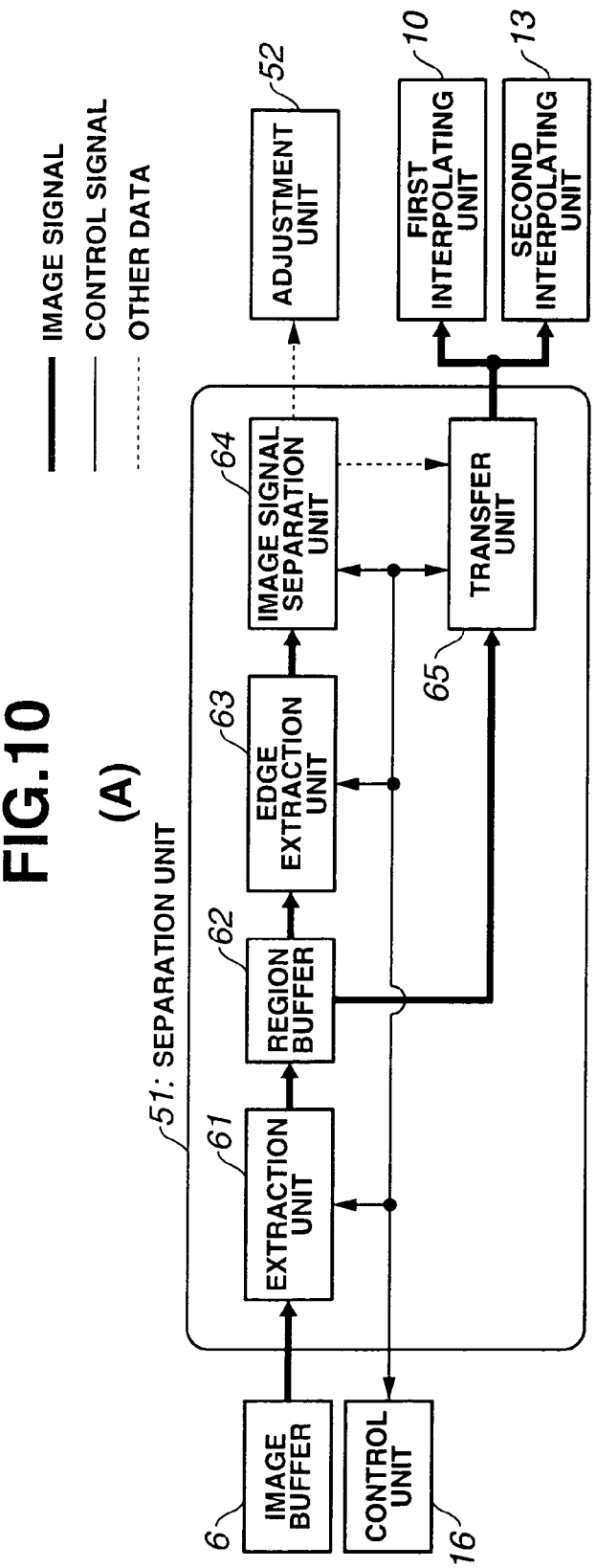
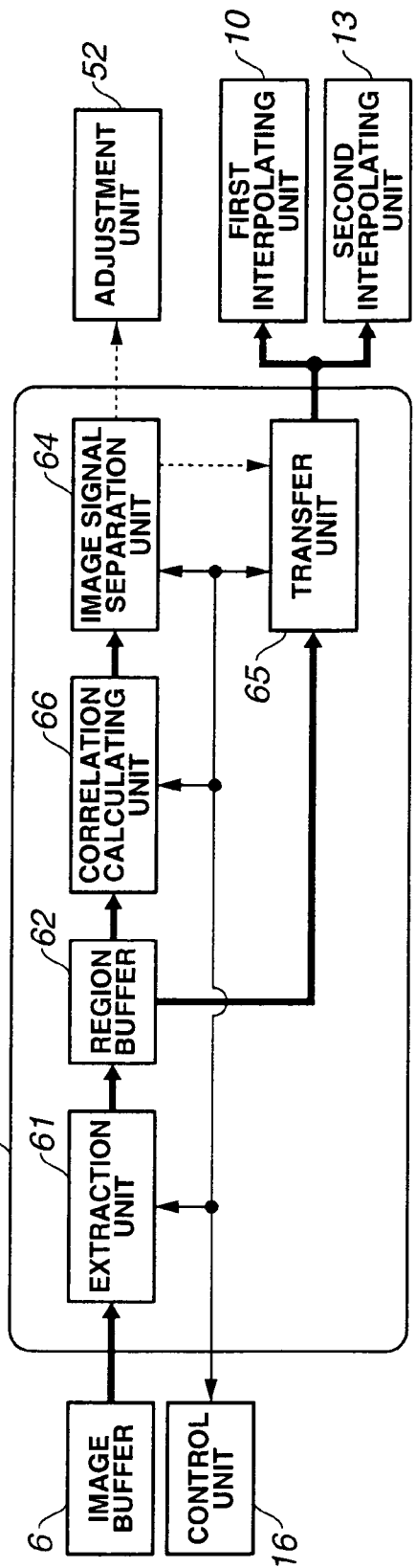

FIG.11
(A)
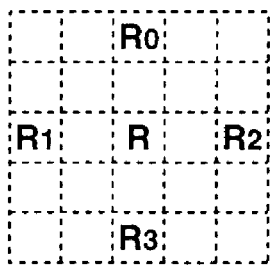
$E_0 = | R - R_0 |$
$E_1 = | R - R_1 |$
$E_2 = | R - R_2 |$
$E_3 = | R - R_3 |$
(B)
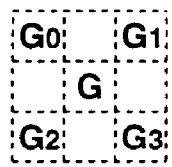
$E_0 = | G - G_0 |$
$E_1 = | G - G_1 |$
$E_2 = | G - G_2 |$
$E_3 = | G - G_3 |$
(C)
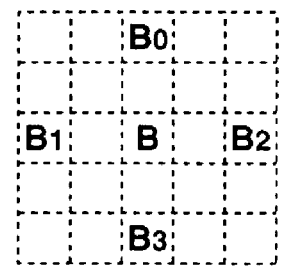
$E_0 = | B - B_0 |$
$E_1 = | B - B_1 |$
$E_2 = | B - B_2 |$
$E_3 = | B - B_3 |$

FIG.14

| CLASS | RGB RELATIONSHIP |
|---|---|
| 0 | R = G = B |
| 1 | B > R > G |
| 2 | R = B > G |
| 3 | R > B > G |
| 4 | R > G = B |
| 5 | R > G > B |
| 6 | R = G > B |
| 7 | G > R > B |
| 8 | G > R = B |
| 9 | G > B > R |
| 10 | G = B > R |
| 11 | B > G > R |
| 12 | B > R = G | ns
IMAGING SYSTEM AND IMAGE PROCESSING PROGRAM

This application is a U.S. National Phase Application under 35 USC 371 of International Application PCT/JP2004/000395 filed Jan. 20, 2004.

TECHNICAL FIELD

The present invention relates to an image pickup system and image processing program that obtain high-quality image signals by using a plurality of interpolation methods in an adaptive combination to interpolate color signals that have dropped out.

BACKGROUND ART

Cameras using a single-plate CCD as an image pickup system currently constitute the mainstream of digital still cameras, video cameras and the like that are commercially marketed for general use. Such single-plate CCDs are configured with color filters disposed on the front surface, and can be classified into the two main categories of complementary color system and primary color system according to the type of color filter used.

Regardless of whether the type of color filter used is the complementary color system or primary color system, single-plate color CCDs with the configuration described as above are similar in that one color signal is assigned to one pixel. Accordingly, in order to obtain all of the color signals for one pixel, it is necessary to perform processing that interpolates color signals that have dropped out in the respective pixels.

Interpolation processing must be performed not only in such single-plate systems, but also in two-plate image pickup systems or even three-plate image pickup systems in which pixels are shifted.

Techniques in which correlations or edges are detected, and interpolation processing is performed in directions with a high correlation or flat directions with a low edge intensity, have been described (for example) in Japanese Patent Application Laid-Open No. 7-236147 and Japanese Patent Application Laid-Open No. 8-298670.

Furthermore, a technique using color correlations in local regions is described in Japanese Patent Application Laid-Open No. 2000-224601 as another example of the abovementioned interpolation processing.

Furthermore, a technique in which different interpolation methods are combined when enlargement processing is performed, e.g., in which cubic interpolation is used for R signals and G signals and nearest-neighbor interpolation is used for B signals and the like, is described in Japanese Patent Application Laid-Open No. 2000-151989.

Meanwhile, in the abovementioned Japanese Patent Application Laid-Open No. 2000-224601, a technique is described in which adaptive switching is performed between interpolation by color correlation and linear interpolation.

Means for performing interpolation in selected directions as described in the abovementioned Japanese Patent Application Laid-Open No. 7-236147 and Japanese Patent Application Laid-Open No. 8-298670 functions well in cases where the image signals are configured with a single edge structure; however, in cases where there are a plurality of edge structures as in texture images, the precision of interpolation may drop because of a failure in the selection of the direction.

Furthermore, interpolation based on color correlations such as that described in the abovementioned Japanese Patent Application Laid-Open No. 2000-224601 allows high-precision interpolation even in cases where there are a plurality of edge structures as in textures, as long as these images have a single hue. However, in the boundary regions between different hues, artifacts may be generated due to a failure in the estimation of the color correlation.

Furthermore, while means that combines different interpolation methods such as the means described in the abovementioned Japanese Patent Application Laid-Open No. 2000-151989 is advantageous in that such means allows higher-precision interpolation as a whole by performing interpolation processing in regions where these methods respectively have strong points, the question of how to perform switching control of the interpolation processing in an advantageous manner becomes important. However, since the switching method described in this Japanese Patent Application Laid-Open No. 2000-151989 is fixed, the precision drops in cases where (for example) there is a complicated edge structure in the B (blue) signal, so that the merits of the respective interpolation methods cannot be used to advantage.

Furthermore, in the technique described in the abovementioned Japanese Patent Application Laid-Open No. 2000-224601, switching control of the interpolation method is performed on the basis of an original signal in which one or more color signals drop out; accordingly, the control method is complicated, and the processing time is long.

The present invention is devised in light of the above facts; it is an object of the present invention to provide an image pickup system and image processing program which make it possible to interpolate color signals that have dropped out in image signals with a higher degree of precision.

DISCLOSURE OF THE INVENTION

The image pickup system of the present invention is an image pickup system for processing an image signal at each pixel which is composed of more than one color signals and one or more of the color signals are dropped out according to the location of the pixel, the image pickup system comprising a first interpolating unit that interpolates the color signals that have dropped out from the image signal by a first interpolation method based on edge detection, a verification unit which verifies the precision of interpolation on the basis of the image signal and the color signals interpolated by the first interpolating unit, and a second interpolating unit that interpolates the color signals that have dropped out from the image signal by a second interpolation method based on the color correlation, different from the first interpolation method, in cases where it is judged that the precision of the interpolation by the first interpolation method is insufficient.

BRIEF DESCRIPTION OF THE DRAWINGS

FIG. 2 is a diagram showing the color layout of the color filters in the first embodiment;

FIG. 4 is a diagram used to illustrate an interpolation method based on edge directions in the first embodiment;

FIG. 6 is a diagram used to illustrate the regression to the linear equation of the color correlation in the first embodiment;

FIG. 10 is a block diagram which shows one example of configuration and another example of configuration of a separation unit in the second embodiment;

FIG. 11 is a diagram used to illustrate edge extraction in the second embodiment;

FIG. 14 is a table used to illustrate the hue classes in the second embodiment;

BEST MODE FOR CARRYING OUT THE INVENTION

Embodiments of the present invention will be described below with reference to the attached figures.

Figure 1:
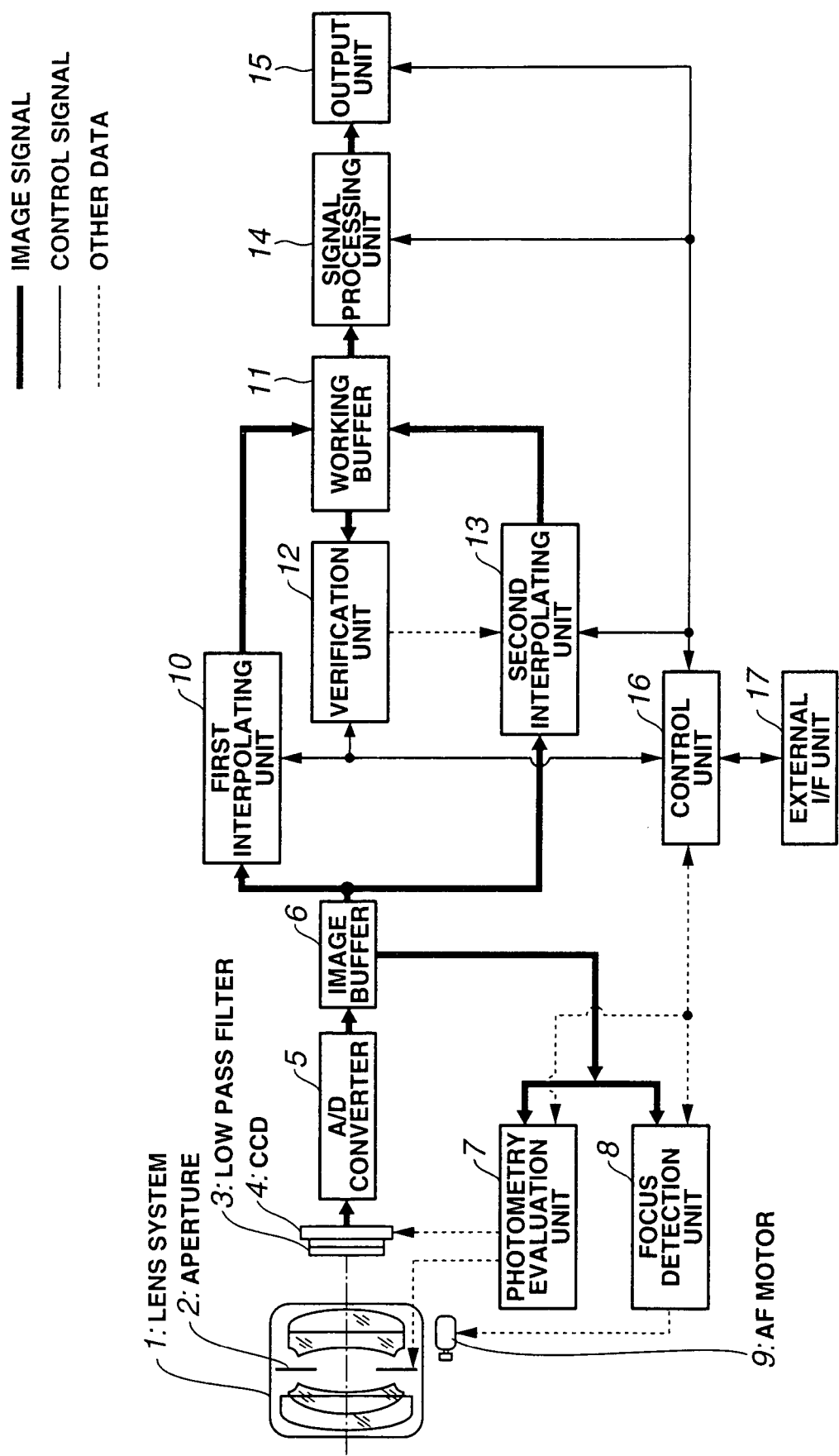
FIG. 1 is a block diagram which shows the configuration of the image pickup system in a first embodiment of the present invention.
Figure 3:
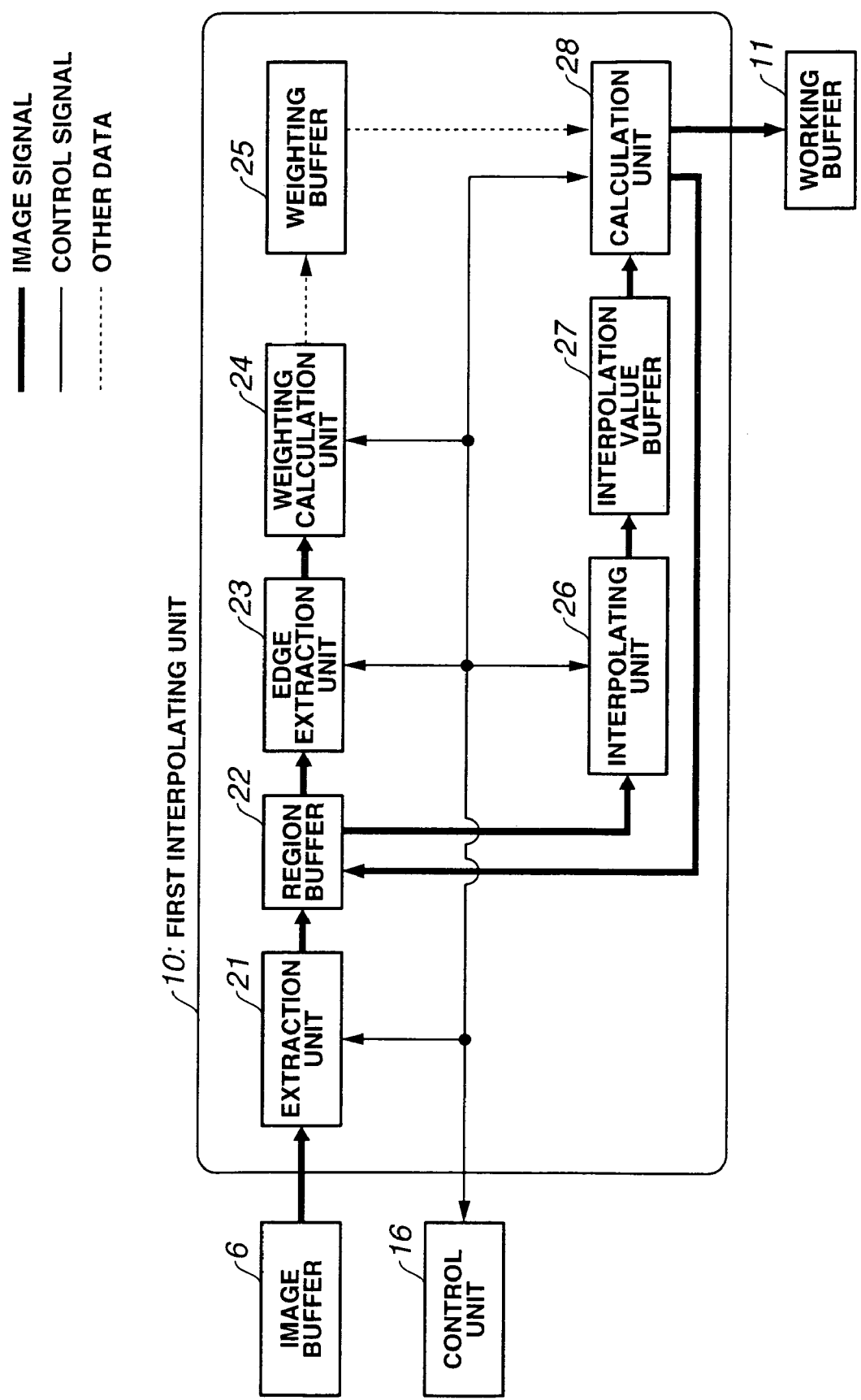
FIG. 3 is a block diagram which shows the configuration of the first interpolating unit in the first embodiment.
Figure 5:
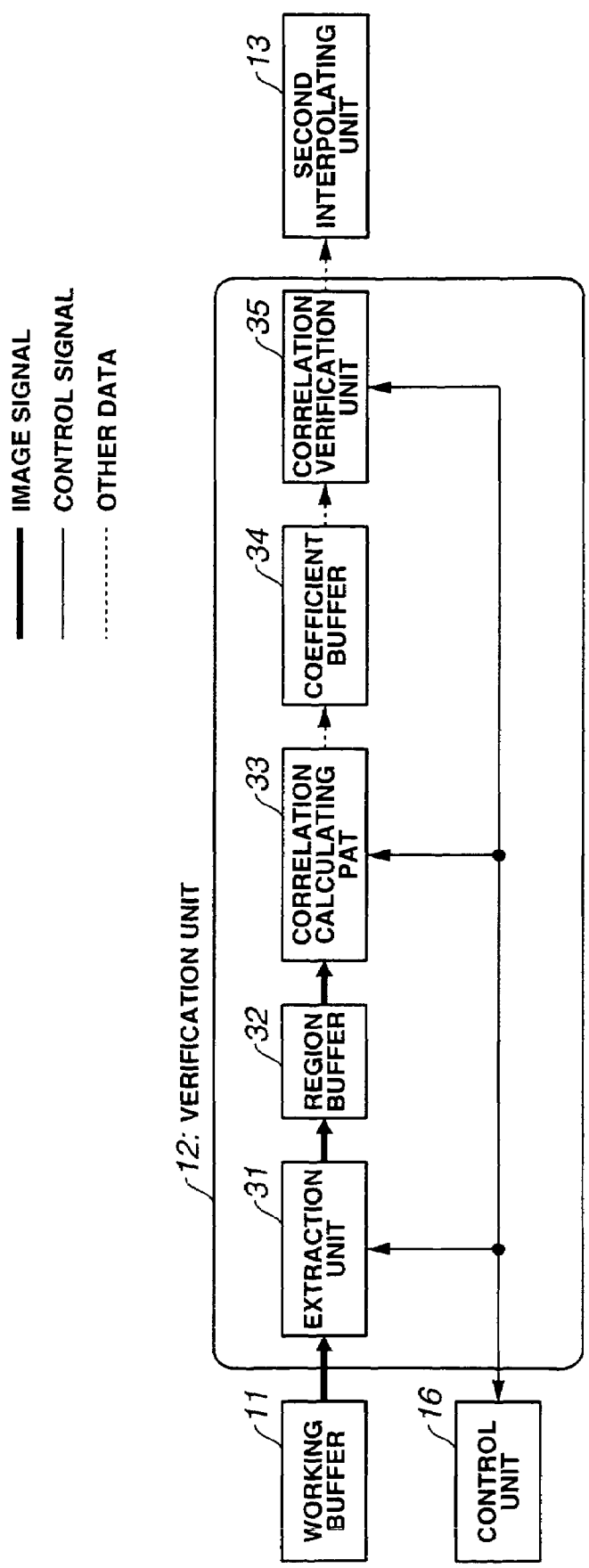
FIG. 5 is a block diagram which shows the configuration of the verification unit in the first embodiment.
Figure 7:
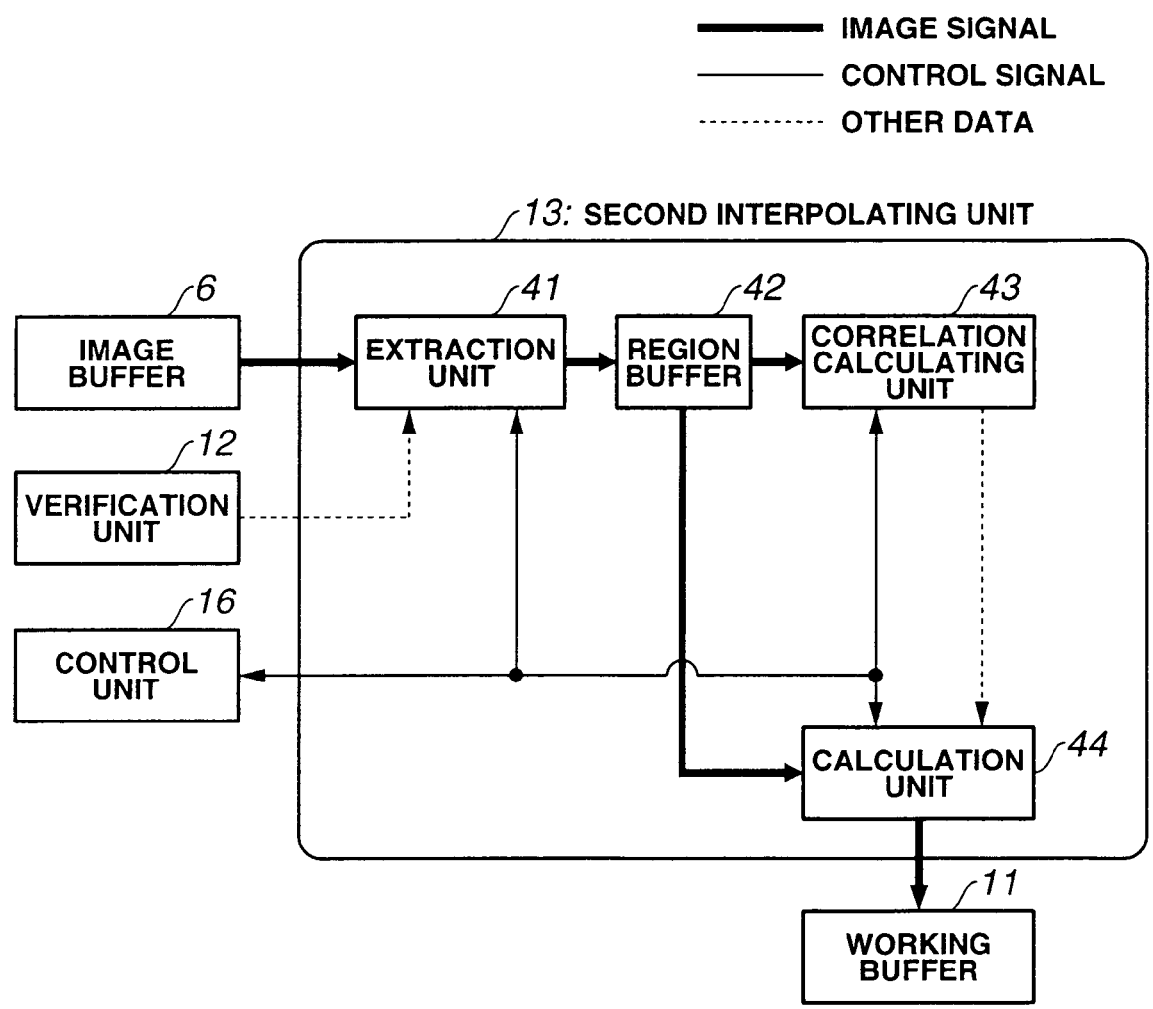
FIG. 7 is a block diagram which shows the configuration of the second interpolating unit in the first embodiment.
Figure 8:
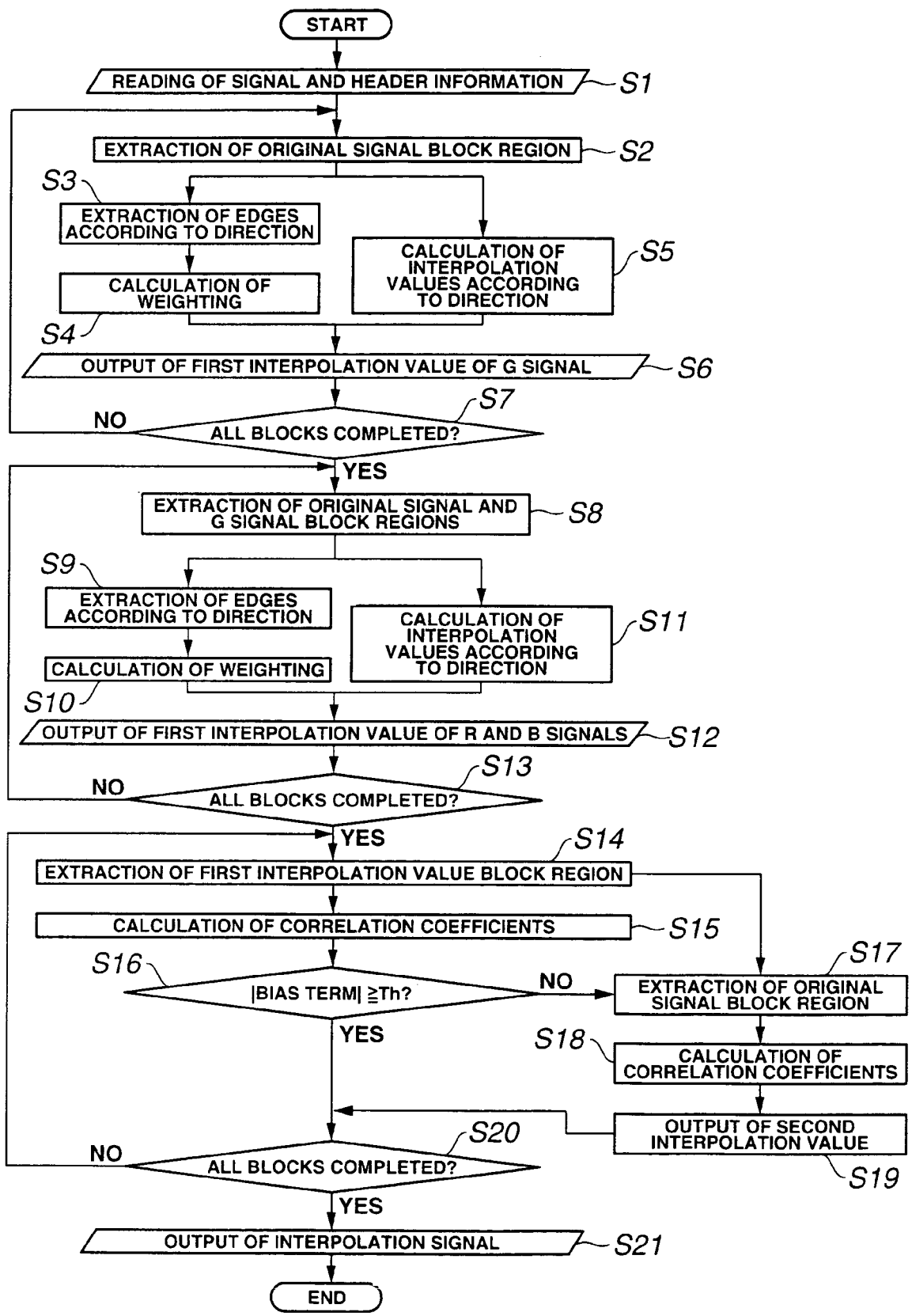
FIG. 8 is a flow chart showing the interpolation processing according to the image processing program in the first embodiment.

FIGS. 1 through 8 show a first embodiment of the present invention. FIG. 1 is a block diagram which shows the configuration of the image pickup system, FIG. 2 is a diagram which shows the color layout of the color filters, FIG. 3 is a block diagram which shows the configuration of the first interpolating unit, FIG. 4 is a diagram used to illustrate the interpolation method based on edge directions, FIG. 5 is a block diagram which shows the configuration of the verification unit, FIG. 6 is a diagram used to illustrate the regression to the linear equation of the color correlation, FIG. 7 is a block diagram which shows the configuration of the second interpolating unit, and FIG. 8 is a flow chart showing the interpolation processing according to the image processing program.

As is shown in FIG. 1, the image pickup system comprises: a lens system 1 used to form an image of the subject; an aperture 2 which is disposed inside the lens system 1, and which regulates the transmission range of the luminous flux in the lens system 1; a low pass filter 3 which is used to eliminate unnecessary high-frequency components from the luminous flux that has been formed into an image by the lens system 1; a CCD 4 constituting an image pickup element which subjects the optical image of the subject that is formed via the low pass filter 3 to a photoelectric conversion, and outputs an electrical image signal; an A/D converter 5 which converts the analog image signal that is output from the CCD 4 into a digital signal; an image buffer 6 which temporarily stores the digital image data that is output from the A/D converter 5; a photometry evaluation unit 7 which performs a light measuring evaluation relating to the subject on the basis of the image data stored in the image buffer 6, and controls the aperture 2 and CCD 4 on the basis of these evaluation results; a focus detection unit 8 which detects the focal point on the basis of the image data stored in the image buffer 6, and which drives an AF motor 9 (described later) on the basis of the detection results; the AF motor 9 which is controlled by the focus detection unit 8, and which drives the focusing lens and the like contained in the lens system 1; a first interpolating unit 10 constituting first interpolating means that performs, in the image data stored in the image buffer 6, the interpolation processing of dropped-out color signals on the basis of the edge direction (described in detail later); a working buffer 11 which temporarily stores the original image data transferred from the image buffer 6 via the first interpolating unit 10 and the interpolation data relating to dropped-out colors processed by the first interpolating unit 10, and which writes the interpolation data relating to dropped-out colors processed by the second interpolating unit 13 (described later) over the interpolation data relating to dropped-out colors processed by the first interpolating unit 10, and temporarily stores the data; a verification unit 12 constituting verification means that verifies the region where a single color correlation is established on the basis of the original image data stored in the working buffer 11 and the interpolation data of the first interpolating unit 10; a second interpolating unit 13 constituting second interpolating means which reads in the original image data from the image buffer 6 for the region in which it is judged by the verification unit 12 that a single color correlation has been established, and which performs interpolation processing of dropped-out color signals on the basis of color correlations (described in detail later); a signal processing unit 14 which performs, after the processing performed by the second interpolating unit 13 has been completed, universally known emphasis processing, compression processing and the like on the interpolated image data that is output from the working buffer 11; an output unit 15 which outputs the image data from the signal processing unit 14 in order to record the data on (for example) a memory card or the like; an external I/F unit 17 constituting information acquisition means comprising interfaces for the power supply switch, shutter button, mode switches for switching various types of image pickup modes and image quality modes, changeover switch for switching the interpolation processing and the like; and a control unit 16 constituting control means such as a microcomputer or the like, which acquire data from the photometry evaluation unit 7 and focus detection unit 8, and which are connected in a bidirectional manner with the first interpolating unit 10, verification unit 12, second interpolating unit 13, signal processing unit 14, output unit 15 and external I/F unit 17 so as to perform comprehensive control of the image pickup system including these units, the control unit 16 being used also as information acquisition means and judgment means.

Next, the color layout of the color filters disposed on the front surface of the CCD 4 will be described with reference to FIG. 2.

In the present embodiment, an image pickup system comprising single plate primary color type color filters is envisioned; for example, primary color Bayer type color filters such as those shown in FIG. 2 are disposed on the front surface of the CCD 4.

As is shown in FIG. 2 (A), the primary color Bayer type color filter arrangement comprises a basic layout of 2×2 pixels in which two G (green) pixels are disposed in a diagonal direction, and R (red) and B (blue) are respectively disposed in the other two pixels. This basic layout is repeated in two dimensions in the vertical direction and horizontal direction, so that the respective pixels on the surface of the CCD 4 are covered, thus forming a filter layout such as that shown in FIG. 2 (B).

Thus, the image signals obtained from an image pickup system comprising single plate primary color type color filters is a signal at each pixel which is composed of three color signals and the two color signals are dropped out according to the location of the pixel (i.e., in which two of the color components other than the disposed color filter drop out).

Next, the flow of signals in the image pickup system shown in the FIG. 1 will be described.

The image pickup system is configured such that the image quality mode such as the compression rate, image size and the like, the image pickup mode such as character image pickup, movie image pickup and the like, the switching of the interpolation processing and the like can be set by the user via the external I/F unit 17. After these settings have been set, the pre-image-pickup mode is entered by half-pressing the shutter button, which is a two-stage type push-button switch.

The image signal that is picked up by the CCD 4 via the lens system 1, aperture 2 and low pass filter 3, and then output from the CCD 4, is converted into a digital signal by the A/D converter 5, and is then transferred to the image buffer 6.

The image signal in the image buffer 6 is subsequently transferred to the photometry evaluation unit 7 and focus detection unit 8.

The photometry evaluation unit 7 determines the luminance level in the image, and controls the aperture value of the aperture 2, the electronic shutter speed of the CCD 4 and the like so that an appropriate exposure is obtained.

Furthermore, the focus detection unit 8 detects the edge intensity in the image, and obtains a focused image by controlling the AF motor 9 so that the edge intensity shows a maximum value.

When preparations for the main image pickup have been completed by carrying out such a pre-image-pickup mode, the main image pickup is next performed when it is detected via the external I/F unit 17 that the shutter button has been fully pressed.

The main image pickup is performed on the basis of the exposure conditions determined by the photometry evaluation unit 7 and focus detection unit 8, and these conditions at the time of image pickup are transferred to the control unit 16.

When the main image pickup is thus performed, the image signal is transferred to the image buffer 6 and stored in the same manner as in the case of the abovementioned pre-image-pickup.

Under the control of the control unit 16, the first interpolating unit 10 reads out the image signal involved in the main image pickup that is stored in the image buffer 6, and performs interpolation processing on the basis of the edge direction. In the present embodiment, as is described above, a single plate type image pickup system in which primary color type color filters are disposed on the front surface of the CCD 4 is envisioned; accordingly, two color signals drop out for one pixel. Consequently, in the interpolation processing, two dropped-out color signals are generated, and are output as interpolation signals.

Furthermore, the first interpolating unit 10 transfers the interpolation signals obtained by the interpolation processing and the original signal read out from the image buffer 6 to the working buffer 11. Thus, when the interpolation signals and original signal are stored in the working buffer 11, a three-plate signal in which three signals, i.e., RGB, are present is obtained for one pixel.

Next, under the control of the control unit 16, the verification unit 12 sequentially reads in the three-plate signal stored in the working buffer 11 in units of a predetermined local region (e.g., 5×5 pixels). Then, the verification unit 12 performs a regression with the correlation in the local region as a linear equation, verifies whether or not a singled color correlation is established, and transfers the verification results to the second interpolating unit 13.

Under the control of the control unit 16, the second interpolating unit 13 reads in, from the image buffer 6, the original signal corresponding to the local region in which it has been judged by the verification unit 12 that a single color correlation has been established, and performs interpolation processing on the basis of the color correlation.

The interpolation signal produced by the second interpolating unit 13 is transferred to the working buffer 11, and is recorded so that the signal is written over the interpolation results produced by the first interpolating unit 10. As a result, for local regions in which it is judged by the verification unit 12 that a single color correlation is established, the signal is replaced by the interpolation signal produced by the second interpolating unit 13.

The control unit 16 controls such that the three-plate signal in the working buffer 11 is transferred to the signal processing unit 14 after the verification performed by the verification unit 12 and the interpolation performed by the second interpolating unit 13 (it is performed only in cases where such interpolation is necessary according to the verification results) have been completed for all of the signals in the working buffer 11.

Under the control of the control unit 16, the signal processing unit 14 performs universally known emphasis processing, compression processing and the like on the image signal following the abovementioned interpolation processing, and transfers the resulting signal to the output unit 15.

The output unit 15 outputs the image data from the signal processing unit 14 in order to record the data on (for example) a memory card or the like.

Next, one example of the configuration of the first interpolating unit 10 will be described with reference to FIG. 3.

The first interpolating unit 10 comprises: an extraction unit 21 constituting extraction means for sequentially extracting regions of a predetermined size from the image data stored in the image buffer 6; a region buffer 22 which stores the data of the regions extracted by the extraction unit 21; an edge extraction unit 23 constituting edge extraction means for calculating the edge components of the regions stored in the region buffer 22; a weighting calculation unit 24 constituting weighting calculation means for normalizing the edge components calculated by the edge extraction unit 23 and calculating weighting coefficients; a weighting buffer 25 which stores the weighting coefficients calculated by the weighting calculation unit 24; an interpolating unit 26 constituting interpolation signal calculation means for calculating color difference components serving as interpolation signals for pixels of interest in the regions stored in the region buffer 22; an interpolation value buffer 27 which stores the color difference components calculated by the interpolating unit 26; and a calculation unit 28 constituting calculation means for calculating the dropped-out color components in the positions of pixels of interest from the color difference components stored in the interpolation value buffer 27 and the weighting coefficients stored in the weighting buffer 25, and outputting these components to the region buffer 22 and working buffer 11.

Furthermore, when the dropped-out component associated with one color is calculated by the calculation unit 28, the calculation results produced by the calculation unit 28 are also stored in the region buffer 22 in order to interpolate the dropped-out components associated with other colors using the calculated dropped-out color component.

Furthermore, the control unit 16 is bidirectionally connected with the extraction unit 21, edge extraction unit 23, weighting calculation unit 24, interpolating unit 26, and calculation unit 28, and controls these units.

The operation of the first interpolating unit 10 will be described with reference to FIG. 4.

Under the control of the control unit 16, the extraction unit 21 sequentially extracts regions of a predetermined size (e.g., a size of 6×6 pixels) from the image buffer 6, and transfers these regions to the region buffer 22.

FIG. 4 (A) shows the regions having a size of 6×6 pixels extracted by the extraction unit 21, and the color signals Sij (S=R, G, B; X direction (horizontal direction) coordinate i=0 to 5, Y direction (vertical direction) coordinate j=0 to 5).

Using such regions with a size of 6×6 pixels, the first interpolating unit 10 performs interpolation processing for the 2×2 pixel positions of the central portion, and, in the example shown in FIG. 4, calculates the drop-out components G22 and B22 for the R22 position, the drop-out components R32 and B32 for the G32 position, the drop-out components R23 and B23 for the G23 position, and the drop-out components R33 and G33 for the B33 position.

Since interpolation processing is performed in the 2×2 pixel positions of the central portion, when the extraction unit 21 extracts regions having a size of 6×6 pixels, the extraction unit 21 performs sequential extractions while shifting the X direction position or Y direction position by 2 pixels at a time, so that four pixels each are respectively duplicated in the X direction or Y direction.

Under the control of the control unit 16, the edge extraction unit 23 and interpolating unit 26 first perform interpolation processing relating to the drop-out component G22 of the R22 position and the drop-out component G33 of the B33 position.

First, for the R22 pixel, the edge extraction unit 23 calculates the edge components in four directions, i.e., up, down, left and right as shown in the following Equation (1) using the values of the peripheral pixels shown in FIG. 4 (B), and transfers these components to the weighting calculation unit 24.

$E\ \text{up}=|R22-R20|+|G21-G23|$ $E\ \text{down}=|R22-R24|+|G21-G23|$ $E\ \text{left}=|R22-R02|+|G12-G32|$ $E\ \text{right}=|R22-R42|+|G12-G32|$ <Equation (1)>

The weighting calculation unit 24 determines the total of the edge components in these four directions as shown in the following Equation (2):

$\text{total}=E\ \text{up}+E\ \text{down}+E\ \text{left}+E\ \text{right}$ <Equation (2)>

Being normalized by dividing the edge components in the four directions which are calculated by the edge extraction unit 23, the weighting coefficients are calculated by the total as shown in the following Equation (3) and are transferred to the weighting buffer 25 and stored.

$W\ \text{up}=E\ \text{up}/\text{total}$ $W\ \text{down}=E\ \text{down}/\text{total}$ $W\ \text{left}=E\ \text{left}/\text{total}$ $W\ \text{right}=E\ \text{right}/\text{total}$ <Equation (3)>

Meanwhile, for the R22 pixel, the interpolating unit 26 interpolates the color difference components in the four directions up, down, left and right as shown in the following Equation (4), transfers these components to the interpolation value buffer 27, and stores these components in the buffer 27.

$Cr\ \text{up}=G21-(R22+R20)/2$ $Cr\ \text{down}=G23-(R22+R24)/2$ $Cr\ \text{left}=G12-(R22+R02)/2$ $Cr\ \text{right}=G32-(R22+R42)/2$ <Equation (4)>

Under the control of the control unit 16, the calculation unit 28 calculates the component G22 that drops out in the R22 position as shown in the following Equation (5) using the weighting coefficients stored in the weighting buffer 25 and the interpolation values (color difference components) stored in the interpolation value buffer 27, transfers the component G22 to the region buffer 22 and working buffer 11, and stores the component in these buffers.

$G22=R22+\Sigma Crk\times Wk$ ($k$=up, down, left, right) <Equation (5)>

Next, G33 for the B33 position is calculated using the values of the peripheral pixels shown in FIG. 4 (C) in the same manner as in the determination of G22 for the R22 position, and the G33 is transferred to the region buffer 22 and working buffer 11, and stored in these buffers.

The Equations (6) through (10) respectively corresponding to the abovementioned Equations (1) through (5) that are used in the calculation of the G33 are as follows:

$E\ \text{up}=|B33-B31|+|G32-G34|$ $E\ \text{down}=|B33-B35|+|G32-G34|$ $E\ \text{left}=|B33-B13|+|G23-G43|$ $E\ \text{right}=|B33-B53|+|G23-G43|$ <Equation (6)>

$\text{total}=E\ \text{up}+E\ \text{down}+E\ \text{left}+E\ \text{right}$ <Equation (7)>

$W\ \text{up}=E\ \text{up}/\text{total}$ $W\ \text{down}=E\ \text{down}/\text{total}$ $W\ \text{left}=E\ \text{left}/\text{total}$ $W\ \text{right}=E\ \text{right}/\text{total}$ <Equation (8)>

$Cb\ \text{up}=G32-(B33+B31)/2$ $Cb\ \text{down}=G34-(B33+B35)/2$ $Cb\ \text{left}=G23-(B33+B13)/2$ $Cb\ \text{right}=G43-(B33+B53)/2$ <Equation (9)>

$G33=B32+\Sigma Cbk\times Wk$ ($k$=up, down, left, right) <Equation (10)>

The difference from the abovementioned G22 in the calculation of the G33 is as follows: namely, in the case of the abovementioned G22, the color difference components in the four directions are the Cr components (G−R), while in the case of the G33, these components are the Cb components (G−B).

The abovementioned interpolation processing for the G signals is performed for all of the signals in the image buffer 6 by sequentially extracting regions with a size of 6×6 pixels, and all of the interpolated G signals are stored in the region buffer 22 and working buffer 11.

Next, the control unit 16 again sequentially extracts regions with a size of 6×6 pixels, and causes the edge extraction unit 23 and interpolating unit 26 to perform interpolation processing of the drop-out components R32 and B32 for the G32 position, the drop-out components R23 and B23 for the G23 position, the remaining drop-out component B22 for the R22 position, and the remaining drop-out component R33 for the B33 component, as shown in FIGS. 4 (D) through 4 (G). When such interpolation processing is performed, processing is also performed using the G signals calculated as described above.

FIG. 4 (D) is a diagram showing the conditions of the peripheral pixels used in the interpolation of R23 and B23 for the G23 position.

First, Equations (11) through (15) (respectively corresponding to the abovementioned Equations (1) through (5)) that are used in the calculation of R23 are as follows:

$E$ upper left=|G23−G02|

$E$ upper center=|G23−G22|

$E$ upper right=|G23−G42|

$E$ lower left=|G23−G04|

$E$ lower center=|G23−G24|

$E$ lower right=|G23−G44|  <Equation (11)> total=$E$ upper left+$E$ upper center+$E$ upper right+$E$ lower left+$E$ lower center+$E$ lower right  <Equation (12)>

$W$ upper left=$E$ upper left/total $W$ upper center=$E$ upper center/total $W$ upper right=$E$ upper right/total $W$ lower left=$E$ lower left/total $W$ lower center=$E$ lower center/total $W$ lower right=$E$ lower right/total  <Equation (13)>

$Cr$ upper left=G02−R02

$Cr$ upper center=G22−R22

$Cr$ upper right=G42−R42

$Cr$ lower left=G04−R04

$Cr$ lower center=G24−R24

$Cr$ lower right=G44−R44  <Equation (14)>

$R23=G23-\Sigma Crk \times Wk$ ($k$=upper left, upper center, upper right, lower left, lower center, lower right)  <Equation (15)>

Furthermore, Equations (16) through (20) (respectively corresponding to the abovementioned Equations (1) through (5)) that are used in the calculation of B23 are as follows:

$E$ upper left=|G23−G11|

$E$ upper right=|G23−G31|

$E$ center left=|G23−G13|

$E$ center right=|G23−G33|

$E$ lower left=|G23−G15|

$E$ lower right=|G23−G35|  <Equation (16)> total=$E$ upper left+$E$ upper right+$E$ center left+$E$ center right+$E$ lower left+$E$ lower right  <Equation (17)>

$W$ upper left=$E$ upper left/total $W$ upper right=$E$ upper right/total $W$ center left=$E$ center left/total $W$ center right=$E$ center right/total $W$ lower left=$E$ lower left/total $W$ lower right=$E$ lower right/total  <Equation (18)>

$Cb$ upper left=G11−B11

$Cb$ upper right=G31−B31

$Cb$ center left=G13−B13

$Cb$ center right=G33−B33

$Cb$ lower left=G15−B15

$Cb$ lower right=G35−B35  <Equation (19)>

$B23=G23-\Sigma Cbk \times Wk$ ($k$=upper left, upper right, center left, center right, lower left, lower right)  <Equation (20)>

Next, FIG. 4 (E) is a diagram showing the conditions of the peripheral pixels that are used in the interpolation of R32 and B32 for the G32 position.

Equations (21) through (25) (respectively corresponding to the abovementioned Equations (1) through (5)) that are used in the calculation of R32 are as follows:

$E$ upper left=|G32−G20|

$E$ upper right=|G32−G40|

$E$ center left=|G32−G22|

$E$ center right=|G32−G42|

$E$ lower left=|G32−G24|

$E$ lower right=|G32−G44|  <Equation (21)> total=$E$ upper left+$E$ upper right+$E$ center left+$E$ center right+$E$ lower left+$E$ lower right  <Equation (22)>

$W$ upper left=$E$ upper left/total $W$ upper right=$E$ upper right/total $W$ center left=$E$ center left/total $W$ center right=$E$ center right/total $W$ lower left=$E$ lower left/total $W$ lower right=$E$ lower right/total  <Equation (23)>

$Cr$ upper left=G20−R20

$Cr$ upper right=G40−R40

$Cr$ center left=G22−R22

$Cr$ center right=G42−R42

$Cr$ lower left=G24−R24

$Cr$ lower right=$G44-R44$ <Equation (24)>

$R32=G32-\Sigma Crk \times Wk$ ($k$=upper left, upper right, center left, center right, lower left, lower right) <Equation (25)>

Furthermore, Equations (26) through (30) (respectively corresponding to the abovementioned Equations (1) through (5)) that are used in the calculation of B32 are as follows:

$E$ upper left=$|G32-G11|$ $E$ upper center=$|G32-G31|$ $E$ upper right=$|G32-G51|$ $E$ lower left=$|G32-G13|$ $E$ lower center=$|G32-G33|$ $E$ lower right=$|G32-G53|$ <Equation (26)> total=$E$ upper left+$E$ upper center+$E$ upper right+$E$ lower left+$E$ lower center+$E$ lower right <Equation (27)>

$W$ upper left=$E$ upper left/total $W$ upper center=$E$ upper center/total $W$ upper right=$E$ upper right/total $W$ lower left=$E$ lower left/total $W$ lower center=$E$ lower center/total $W$ lower right=$E$ lower right/total <Equation (28)>

$Cb$ upper left=$G11-B11$ $Cb$ upper center=$G31-B31$ $Cb$ upper right=$G51-B51$ $Cb$ lower left=$G13-B13$ $Cb$ lower center=$G33-B33$ $Cb$ lower right=$G53-B53$ <Equation (29)>

$B32=G32-\Sigma Cbk \times Wk$ ($k$=upper left, upper center, upper right, lower left, lower center, lower right) <Equation (30)>

Thus, weighting coefficients and interpolation values (color difference components) in six directions are used in the interpolation of the drop-out components R23 and B23 for the G23 position, and the drop-out components R32 and B32 for the G32 position.

Next, FIG. 4 (F) shows the conditions of the peripheral pixels used in the interpolation of B22 for the R22 position.

Equations (31) through (35) (respectively corresponding to the abovementioned Equations (1) through (5)) that are used in the calculation of B22 are as follows:

$E$ upper left=$|G22-G11|$ $E$ upper right=$|G22-G31|$ $E$ lower left=$|G22-G13|$ $E$ lower right=$|G22-G33|$ <Equation (31)> total=$E$ upper left+$E$ upper right+$E$ lower left+$E$ lower right <Equation (32)>

$W$ upper left=$E$ upper left/total $W$ upper right=$E$ upper right/total $W$ lower left=$E$ lower left/total $W$ lower right=$E$ lower right/total <Equation (33)>

$Cb$ upper left=$G11-B11$ $Cb$ upper right=$G31-B31$ $Cb$ lower Left=$G13-B13$ $Cb$ lower right=$G33-B33$ <Equation (34)>

$B22=G22-\Sigma Cbk \times Wk$ ($k$=upper left, upper right, lower left, lower right) <Equation (35)>

Next, FIG. 4 (G) is a diagram showing the conditions of the peripheral pixels used in the interpolation of R33 for the B33 position.

Equations (36) through (40) (respectively corresponding to the abovementioned Equations (1) through (5)) that are used in the calculation of R33 are as follows:

$E$ upper left=$|G33-G22|$ $E$ upper right=$|G33-G42|$ $E$ lower left=$|G33-G24|$ $E$ lower right=$|G33-G44|$ <Equation (36)> total=$E$ upper left+$E$ upper right+$E$ lower left+$E$ lower right <Equation (37)>

$W$ upper left=$E$ upper left/total $W$ upper right=$E$ upper right/total $W$ lower left=$E$ lower left/total $W$ lower right=$E$ lower right/total <Equation (38)>

$Cr$ upper left=$G22-R22$ $Cr$ upper right=$G42-R42$ $Cr$ lower left=$G24-R24$ $Cr$ lower right=$G44-R44$ <Equation (39)>

$R33=G33-\Sigma Crk \times Wk$ ($k$=upper left, upper right, lower left, lower right) <Equation (40)>

Next, one example of the configuration of the verification unit 12 will be described with reference to FIG. 5.

The verification unit 12 comprises: an extraction unit 31 constituting extraction means for sequentially extracting regions of a predetermined size from the image data in a three-plate state that is stored in the working buffer 11; a region buffer 32 which stores the image data of the regions extracted by the extraction unit 31; a correlation calculation unit 33 constituting correlation calculation means for calculating the linear equation indicating the color correlations of the regions stored in the region buffer 32; a coefficient buffer 34 which stores bias terms for judging whether or not the region is a single hue region of the linear equation calculated by the correlation calculation unit 33; and a correlation verification unit 35 constituting correlation verification means which compares the absolute values of the bias terms stored in the coefficient buffer 34 with a predetermined threshold value, and which transfers position information for the corresponding regions to the second interpolating unit 13 in cases where these absolute values are equal to or less than the threshold value.

The control unit 16 is bidirectionally connected with the extraction unit 31, correlation calculation unit 33 and correlation verification unit 35, and controls these units.

The operation of the verification unit 12 will be described with reference to FIG. 6.

Under the control of the control unit 16, the extraction unit 31 sequentially extracts regions of a predetermined size (e.g., regions having a size of 5×5 pixels) from the working buffer 11, and transfers these regions to the region buffer 32.

Under the control of the control unit 16, the correlation calculation unit 33 causes a regression of the correlation among the RGB signals to a linear equation on the basis of a least-squares approximation for the regions stored in the region buffer 32.

Specifically, in a case where a linear color correlation is established between the two color signals S and S' (S≠S') where the three signals RGB are denoted by S (S=R, G, B), a regression to the linear equation indicated by the following Equation (41) is effected:

$$S' = \alpha S + \beta \qquad \text{<Equation (41)>}$$

FIG. 6 (A) shows an input image constructed by a single hue, and FIG. 6 (B) shows the regression of the color correlation between the R–G signals to the abovementioned linear equation for the input image constructed by a single hue. Furthermore, both in the case of the regression of the color correlation of the G–B signals and the case of the regression of the color correlation of the R–B signals, these regressions are performed in the same manner as shown in FIG. 6 (B).

In cases where the input image is constructed by a single hue as shown in FIG. 6 (B), the bias term β of Equation (41) has a value that is close to zero.

On the other hand, for example, in cases where the input image is constructed by a plurality of hues as shown in FIG. 6 (C) (two hues in the example shown in the figure, i.e., a region A with a first hue and a region B with a second hue), a plurality of linear formats indicating the color correlation are required as shown in FIG. 6 (D); if this is caused to regress to a single linear format, the bias term β will deviate from a value in the vicinity of zero.

Accordingly, after the input image is caused to regress to a single linear format, the question of whether or not the input image (here, the region that is input) is constructed by a single hue can be ascertained by investigating the bias term β.

On the basis of the principle, the correlation calculation unit 33 determines the bias term β shown in Equation (41), and transfers the determined bias term β to the coefficient buffer 34.

The correlation verification unit 35 compares the absolute value of the bias term β stored in the coefficient buffer 34 with a predetermined threshold value, and transfers the position information of the corresponding region to the second interpolating unit 13 in cases where the absolute value of the bias term β is equal to or less than the threshold value. Subsequently, when the correlation verification unit 35 receives information indicating that the interpolation processing in the second interpolating unit 13 has been completed from the control unit 16, the correlation verification unit 35 shifts to the next region and performs the abovementioned processing.

On the other hand, in cases where the absolute value of the bias term β is greater than the threshold value, the correlation verification unit 35 shifts to the next region and performs the abovementioned processing without transferring anything to the second interpolating unit 13.

While sequentially shifting regions, the verification unit 12 performs such processing for all of the signals in the working buffer 11.

Next, one example of the configuration of the second interpolating unit 13 will be described with reference to FIG. 7.

The second interpolating unit 13 comprises: an extraction unit 41 constituting extraction means for sequentially extracting regions of a predetermined size judged to be single hue regions by the verification unit 12 within the image data stored in the image buffer 6; a region buffer 42 which stores the image data of the regions extracted by the extraction unit 41; a correlation calculation unit 43 for calculating a linear equation that indicate the color correlations of the regions stored in the region buffer 42; and a calculation unit 44 which calculates the color signals that drop out from the original signal stored in the region buffer 42 using the linear equation calculated by the correlation calculation unit 43, and which outputs these signals to the working buffer 11.

The control unit 16 is bidirectionally connected with the extraction unit 41, correlation calculation unit 43 and calculation unit 44, and controls these units.

Next, the operation of the second interpolating unit 13 will be described.

In cases where position information for regions judged to be single hue regions is transferred from the verification unit 12 under the control of the control unit 16, the extraction unit 41 extracts these regions from the image buffer 6, and transfers these regions to the region buffer 42.

Under the control of the control unit 16, the correlation calculation unit 43 causes a regression of the correlation from the original signal in a single-plate state in the region buffer 42 in the linear equation.

Specifically, the three signals RGB are denoted by S (S=R, G, B), the average of the S signals in the object region is designated as AV_S, and the variance is designated as Var_S. In cases where a linear color correlation holds between the two color signals S and S' (S≠S'), there is a regression to the linear equation shown in the following Equation (42).

$$S' = (Var\_S'/Var\_S) \times (S - AV\_S) + AV\_S' \qquad \text{<Equation (42)>}$$

The correlation calculation unit 43 determines the linear equation shown in the Equation (42) between the respective signals R–G, G–B and R–B, and transfers the results to the calculation unit 44.

On the basis of the linear equation shown in Equation (42) and the original signal in the region buffer 42, the calculation unit 44 calculates the dropped-out color signals and transfers these signals to the working buffer 11.

In this case, the interpolation values that are obtained by the first interpolating unit 10 and stored in the working buffer 11 as described above are overwritten by the interpolation values obtained by the second interpolating unit 13.

After the calculation unit 44 has calculated all of the dropped-out color signals in the region, the calculation unit 44 notifies the control unit 16 that the processing has been completed.

Furthermore, in the above description, it is assumed that the processing is performed by hardware. However, the present invention is not necessarily limited to such a configuration; for example, it would also be possible to output the signal from the CCD 4 taken as raw data in an unprocessed state and information such as the image size, the filter information and so on added to the raw data as header information, and to process the data by means of an image processing program constituting separate software in an external computer or the like.

Interpolation processing using an image processing program will be described with reference to FIG. 8.

When the processing is started, the original signal constituting raw data, and the header information, are first read in (step S1), and the original signal is extracted in units of a block region having a predetermined size (step S2).

Then, for the extracted regions, edge components according to the respective directions are calculated as indicated in the abovementioned Equation (1) and the like (step S3), and weighting coefficients according to the respective directions are calculated as indicated in the abovementioned Equation (2), Equation (3) and the like (step S4).

Meanwhile, for the extracted regions, interpolation values for the color difference signals according to the respective directions are determined as indicated in the abovementioned Equation (4) and the like (step S5).

Next, on the basis of the weighting coefficients determined in the abovementioned step S4 and the interpolation values determined in the abovementioned step S5, the G signal is calculated as indicated in the abovementioned Equation (5) and the like and is then output (step S6).

A judgment is made as to whether or not such processing has been completed for all of the extracted block regions corresponding to all of the signals (step S7), and in cases where the processing has not been completed, the processing returns to the abovementioned step S2, and the abovementioned processing is repeated for the next block region.

On the other hand, in cases where processing for the block regions corresponding to all of the signals has been completed, the original signal and the G signal output in the abovementioned step S6 are extracted in units of a block region having a predetermined size (step S8).

Then, for the extracted regions, the edge components according to the respective directions are calculated (step S9), and the weighting coefficients according to the respective directions are calculated (step S10).

Meanwhile, for the regions extracted in the abovementioned step S8, the interpolation values of the color difference signals according to the respective directions are determined (step S11).

Next, the dropped-out R signal and B signal are calculated and output in the same manner as described above on the basis of the weighting coefficients determined in the abovementioned step S10 and the interpolation values determined in the abovementioned step S11 (step S12).

A judgment is made as to whether or not such processing has been completed for all of the extracted block regions corresponding to all of the signals (step S13), and in cases where such processing has not been completed, the processing returns to the abovementioned step S8, and the abovementioned processing is repeated for the next block region.

On the other hand, in cases where the abovementioned processing has been completed for the block regions corresponding to all of the signals, the first interpolation signals output in the abovementioned step S6 and the abovementioned step S12 are extracted in units of a block region having a predetermined size (step S14), and a linear equation indicating the correlation between the color signals is determined as shown in the abovementioned Equation (41) (step S15).

The absolute values of the bias terms of the linear equation obtained in the step S15 are compared with a predetermined threshold value Th (step S16), and in cases where the bias terms are equal to or less than the threshold value Th, the original signal is extracted in units of a block region having a predetermined size (step S17), a linear equation indicating the correlation between the color signals is determined as shown in the abovementioned Equation (42) (step S18), and the dropped-out color signals are calculated on the basis of the linear equation, and are then output (step S19). The output is written over the G signal output in the abovementioned step S6 and the R and B signals output in the abovementioned step S12.

On the other hand, in cases where the bias terms are greater than the threshold value Th in the abovementioned step S16, or in cases where the processing of the abovementioned step S19 has been completed, a judgment is made as to whether or not processing in all of the extracted block regions has been completed for all of the signals (step S20), and in cases where the processing has not been completed, the processing returns to the abovementioned step S14, and the abovementioned processing is repeated for the next block region.

On the other hand, in cases where the processing in all of the block regions has been completed, the processing is ended after the interpolation signal is output (step S21).

Furthermore, processing is always performed by combining the first interpolation processing and second interpolation processing; however, the present invention is not limited to this. For example, in cases where an image quality mode with a high compression rate that does not require high-precision interpolation processing is selected via the external I/F unit 17, or in cases where an image pickup mode such as movie image pickup or the like that requires high-speed processing is selected, it would also be possible to omit the second interpolation processing, and to perform only the first interpolation processing. In such cases, the control unit 16 may control the system such that the operation of the verification unit 12 is stopped, and signals are not transferred to the second interpolating unit 13. In cases where the control unit 16 judges whether or not second interpolation processing is to be performed, at least one type of information selected from a set comprising image quality information relating to the image quality of the image signal such as the compression rate, image size and the like, image pickup mode information that is set in the image pickup system such as character image pickup, movie image pickup or the like, and interpolation processing switching information that is manually set by the user, is acquired, and the judgment is performed on the basis of one or more of these types of information.

Furthermore, in the above description, a primary color Bayer type single-plate CCD is described as an example; however, the present invention is not limited to this. For example, the present invention can be similarly applied to a single-plate CCD equipped with complementary color filters, and the present invention may also be applied to two-plate type image pickup systems, or three-plate type image pickup systems in which pixel shifting is performed.

In this case, three colors are taken for example as the number of color signals used to configure the image signal. However, the present invention is not limited to this; it would also be possible to use (for example) six colors as employed in systems that perform higher-precision color reproduction, and in broad terms, a predetermined number of two or more colors may be used. However, as is universally known, a predetermined plurality of three or more colors are necessary in order to obtain images that can be recognized as ordinary color images by metamerism.

In the first embodiment, since adaptive switching can be performed between first interpolation processing in which interpolation processing is performed on the basis of edge directions and second interpolation processing in which interpolation processing is performed on the basis of color correlations, high-precision interpolation processing can be performed.

Furthermore, since the switching of interpolation processing is performed by signals in a three-plate state with no dropped-out color signals using both the original signal and the first interpolation signals, high-precision, high-speed switching processing can be performed.

Furthermore, by performing interpolation processing on the basis of edge directions, it is possible to perform high-precision interpolation processing in regions comprising a single edge structure. Moreover, by performing interpolation processing on the basis of color correlations, it is possible to perform high-precision interpolation processing in regions comprising a single hue.

Furthermore, since color correlations are determined from signals in a three-plate state, a precision verification can be performed highly accurately. The correlation has a high compatibility with interpolation methods using color correlations, and is suitable for switching control between an interpolation method using color correlations and another interpolation method.

If necessary, furthermore, it would also be possible to shorten the processing time and reduce the power consumption by stopping the second interpolation processing and precision verification processing, and performing only the first interpolation processing. In this case, since the system is devised such that information is obtained in cases where high-precision interpolation is unnecessary due to high compression, and cases where high-speed processing is given priority (as in movie image pickup or the like), control as to whether or not interpolation is to be performed again can be automated, so that the operability is improved. Furthermore, since the switching of interpolation processing can be performed manually in accordance with the intentions of the user, the degree of flexibility with respect to processing is improved.

Thus, in such an image pickup system, since a plurality of interpolation means are adaptively combined, high-precision interpolation processing can be performed. Moreover, since both the original signal and interpolated color signals are used in combination in the switching control of a plurality of interpolation means, high-precision and high-speed switching is possible.

Figure 9:
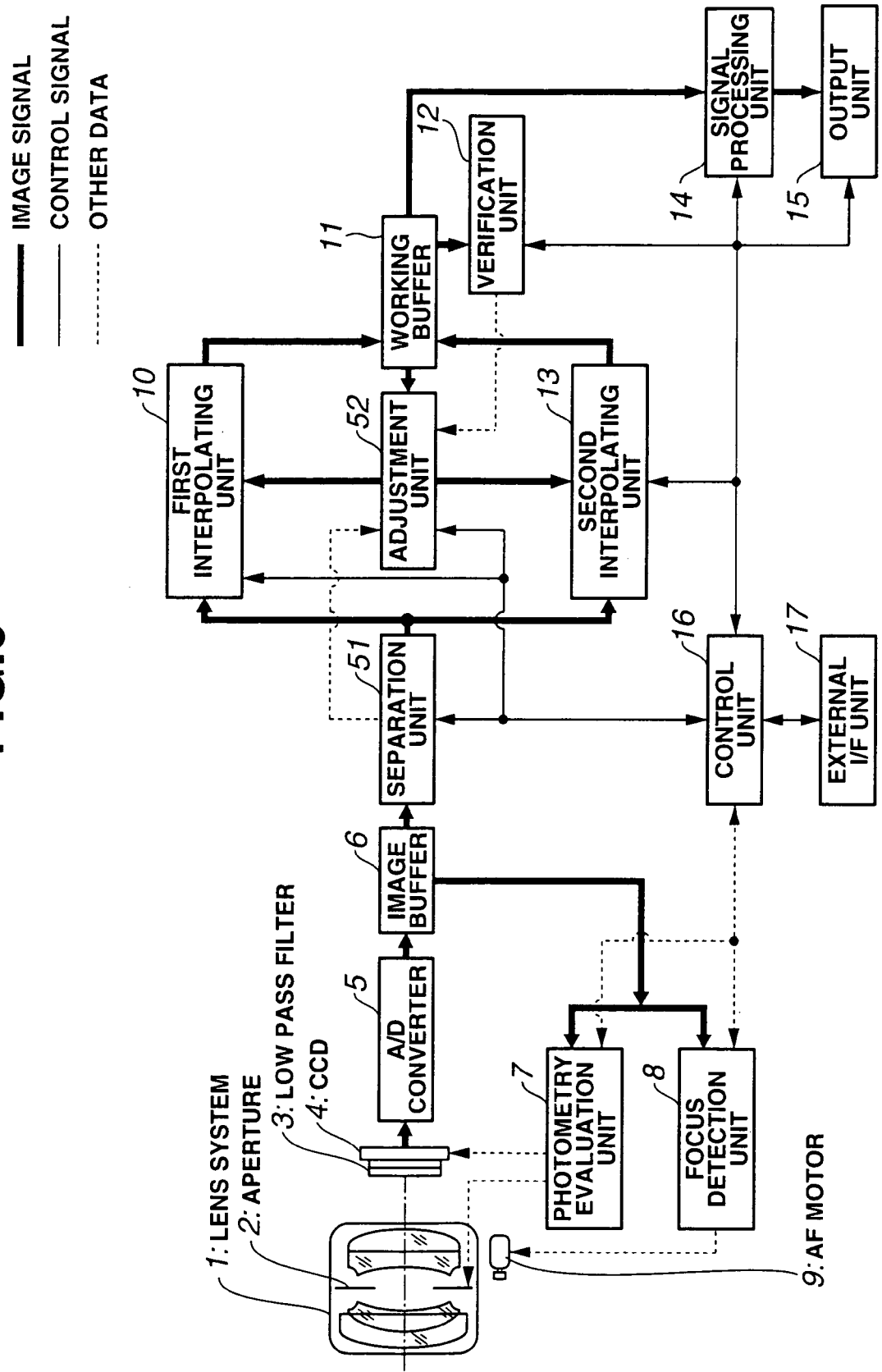
FIG. 9 is a block diagram which shows the configuration of the image pickup system in a second embodiment of the present invention.
Figure 12:
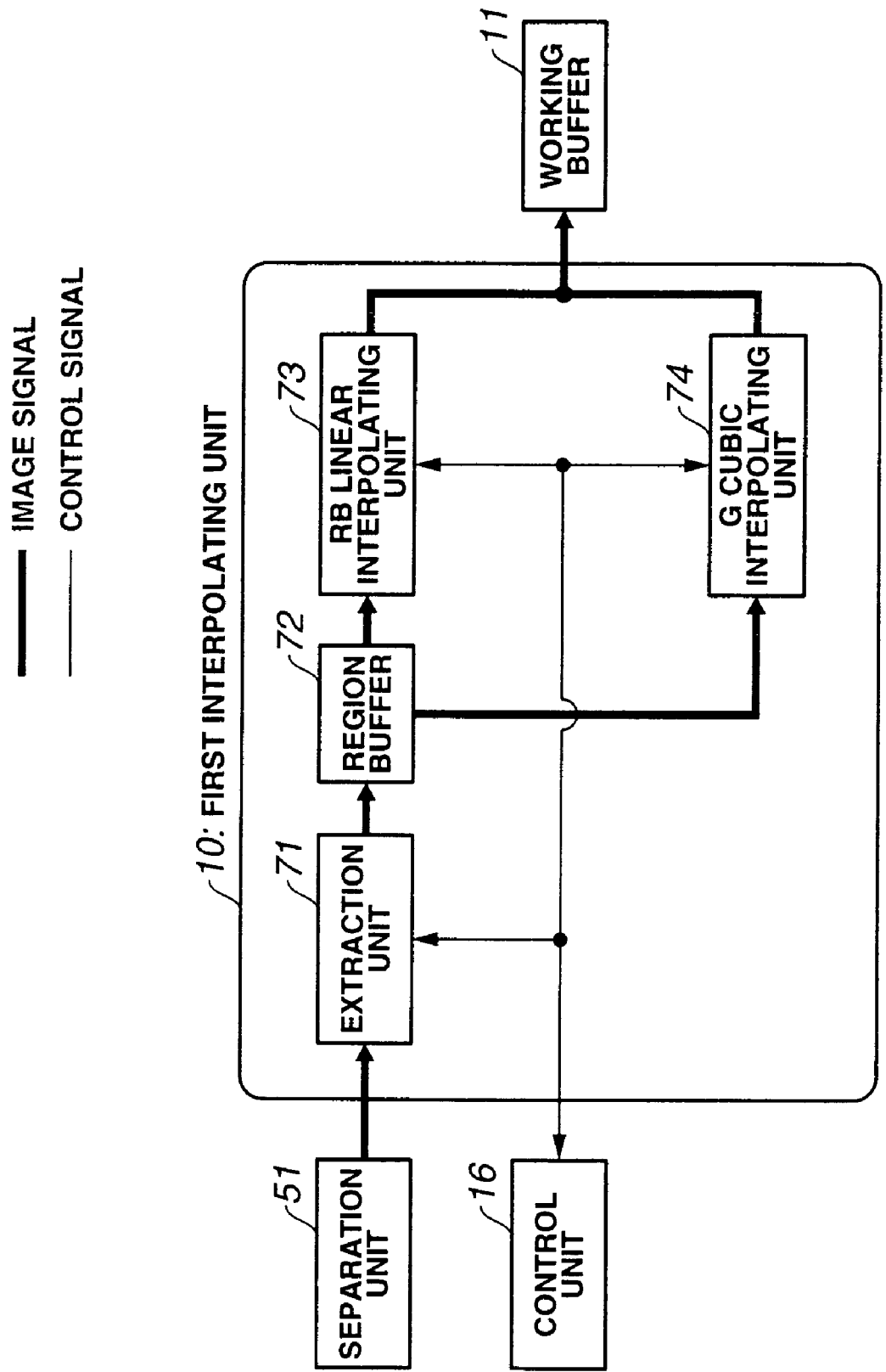
FIG. 12 is a block diagram which shows the configuration of the first interpolating unit in the second embodiment.
Figure 13:
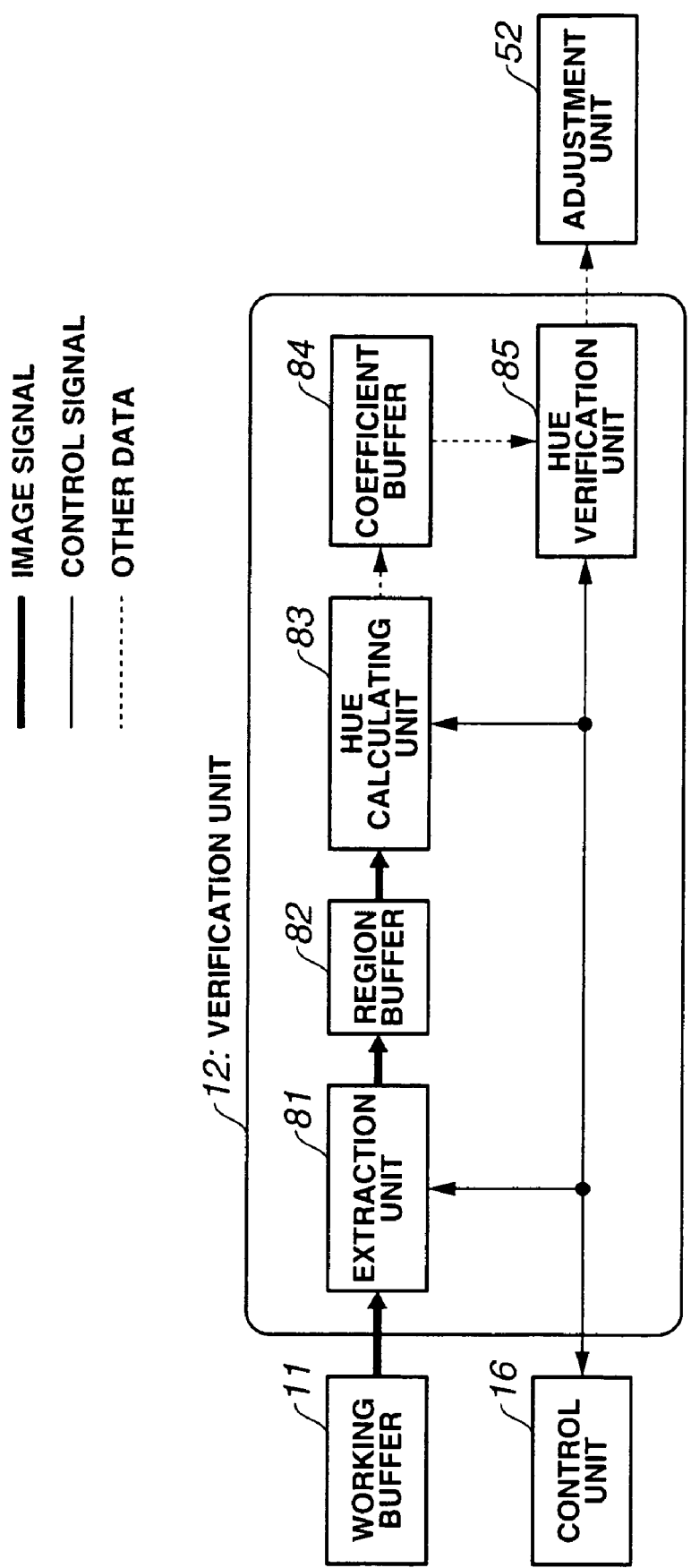
FIG. 13 is a block diagram which shows the configuration of the verification unit in the second embodiment.
Figure 15:
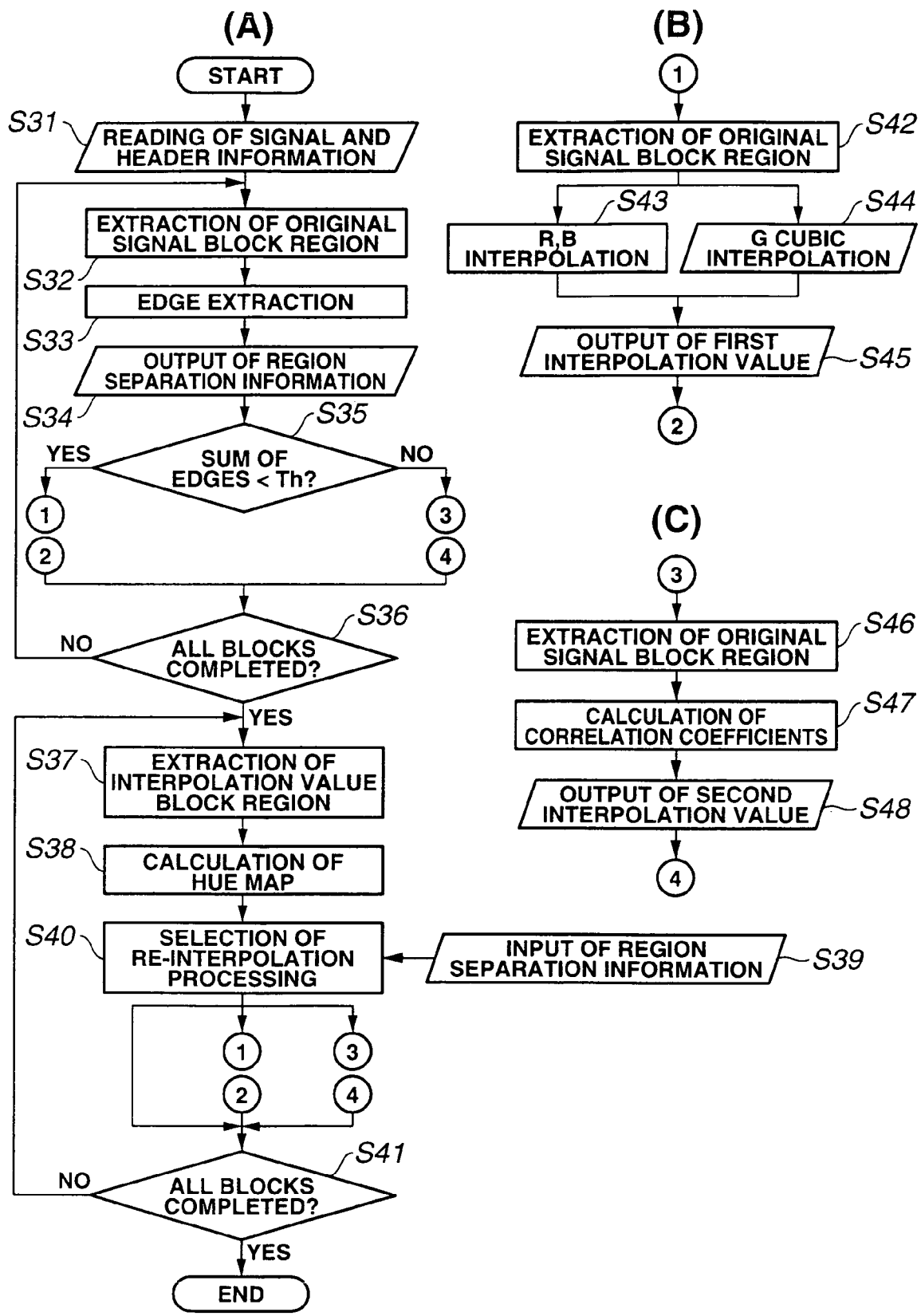
FIG. 15 is a flow chart showing the interpolation processing based on the image processing program in the second embodiment.

FIGS. 9 through 15 show a second embodiment of the present invention. FIG. 9 is a block diagram showing the configuration of the image pickup system, FIG. 10 is a block diagram showing one example of configuration and another example of configuration of the separation unit, FIG. 11 is a diagram used to illustrate edge extraction, FIG. 12 is a block diagram showing the configuration of the first interpolating unit, FIG. 13 is a block diagram showing the configuration of the verification unit, FIG. 14 is a table used to illustrate the hue classes, and FIG. 15 is a flow chart showing the interpolation processing performed using an image processing program.

In the second embodiment, units that are the same as in the first embodiment are labeled with the same symbols, and a description of such parts is omitted; for the most part, only points of difference will be described.

As is shown in FIG. 9, the image pickup system in the second embodiment has a configuration in which a separation unit 51 constituting separation means and an adjustment unit 52 constituting adjustment means are added to the configuration of the first embodiment.

The separation unit 51 reads in image signals (original signals) of predetermined local regions from the image buffer 6, judges whether these regions are flat regions or edge regions (as local characteristics relating to the image signals), outputs the image signals of the local regions to the first interpolating unit 10 in cases where these regions are flat regions, and outputs the image signals of the local regions to the second interpolating unit 13 in cases where these regions are edge regions. The separation unit 51 also outputs region information indicating whether the regions are flat regions or edge regions to the adjustment unit 52.

On the basis of the region information from the separation unit 51 and hue information from the verification unit 12 indicating whether the local regions are single-hue regions or multi-hue regions, the adjustment unit 52 makes an adjustment as to whether or not the interpolation signals already stored in the working buffer 11 are to be replaced by the interpolation signals obtained by causing the first interpolating unit 10 or second interpolating unit 13 to perform interpolation again.

Accordingly, in the second embodiment, the verification unit 12 outputs the verified hue information to the adjustment unit 52 rather than to the second interpolating unit 13.

Furthermore, the working buffer 11 outputs interpolation signals not only to the verification unit 12 but also to the adjustment unit 52.

Furthermore, as will be described later with reference to FIG. 12, the first interpolating unit 10 performs a linear interpolation for the R and B signals, and performs a cubic interpolation for the G signal. Moreover, the verification unit 12 classifies hues into classes in pixel units in the extracted regions, and judges whether the regions are single-hue regions or multi-hue regions on the basis of these distribution conditions.

Furthermore, the control unit 16 is also bidirectionally connected with the separation unit 51 and adjustment unit 52 that are added in the second embodiment, and controls these units.

The basic configuration of other parts is substantially the same as in the first embodiment.

The operation of the image pickup system is basically the same as that of the first embodiment; accordingly, the flow of signals will be described with reference to FIG. 9 for only (or mainly) the parts that are different.

Under the control of the control unit 16, the image signals that are stored in the image buffer 6 are sequentially transferred to the separation unit 51 in units of predetermined local region (e.g., 8×8 pixels).

The separation unit 51 calculates edge components relating to a plurality of predetermined directions for the central 2×2 pixels in the transferred regions of 8×8 pixels. Then, the separation unit 51 compares the calculated edge components with a predetermined threshold value, counts the number of effective edge components that are equal to or greater than the threshold value, and judges whether or not the regions are flat regions or edge regions on the basis of the total number. Furthermore, in cases where a given region is judged to be a flat region, the separation unit 51 transfers the local region of 8×8 pixels to the first interpolating unit 10, while in cases where the region is judged to be an edge region, the separation unit 51 transfers the local region of 8×8 pixels to the second interpolating unit 13.

Furthermore, the separation unit 51 acquires region information indicating whether the region in question is a flat region or an edge region for all of the regions in units of the central 2×2 pixels in the 8×8 pixel region, and transfers the information to the adjustment unit 52.

For the central 2×2 pixels, as is described above, the first interpolating unit 10 calculates the dropped-out color signals by performing universally known linear interpolation processing for the R and B signals, and performing universally known cubic interpolation processing for the G signal. Then, the first interpolating unit 10 outputs the calculated interpolation signals and original signals to the working buffer 11.

Meanwhile, as in the first embodiment, the second interpolating unit 13 performs interpolation processing based on color correlations for the central 2×2 pixels, and outputs the calculated interpolation signals and the original signals to the working buffer 11.

After such interpolation processing has been completed for all of the signals, the control unit 16 sequentially transfers the three-plate signals stored in the working buffer 11 to the verification unit 12 in units of predetermined local region (e.g., 8×8 pixels).

The verification unit 12 selects a hue for each pixel in the local region, and classifies these hues into thirteen types of hue classes (see FIG. 14). Then, on the basis of the distribution conditions of the hue classes determined in pixel units, the verification unit 12 judges whether the local region in question is a single-hue region or a multi-hue region, and transfers the determined hue information to the adjustment unit 52.

On the basis of region information from the separation unit 51 indicating whether the region in question is a flat region or an edge region, and hue information from the verification unit 12 indicating whether the local region is a single-hue region or a multi-hue region, the adjustment unit 52 makes an adjustment as to whether or not interpolation processing is to be performed again.

Specifically, in cases where the region in question is "a flat region and a multi-hue region", and in cases where the region in question is "an edge region and a single-hue region", the adjustment unit 52 leaves the region "as is" without performing interpolation processing again; on the other hand, in cases where the region in question is "a flat region and a single-hue region", and in cases where the region in question is "an edge region and a multi-hue region", the adjustment unit 52 performs an adjustment so that interpolation processing is performed again.

The "flat region and single-hue region" in cases where interpolation processing is performed again is a region for which interpolation by the first interpolating unit 10 is performed in the initial interpolation processing. In this case, the adjustment unit 52 extracts the original signal of the corresponding region from the working buffer 11, transfers this signal to the second interpolating unit 13, and causes interpolation processing to be performed on the basis of color correlations.

Meanwhile, the "edge region and multi-hue region" in cases where interpolation processing is performed again is a region for which interpolation by the second interpolating unit 13 is performed in the initial interpolation processing. In this case, the adjustment unit 52 extracts the original signal of the corresponding region from the working buffer 11, transfers this signal to the first interpolating unit 10, and causes interpolation to be performed by linear interpolation processing or cubic interpolation processing.

The interpolation signals produced by the second interpolation processing are output to the working buffer 11, and are written over the interpolation signals produced by the first interpolation processing of the corresponding region.

After the verification in the verification unit 12 and the adjustment work in the adjustment unit 52 have been completed for all of the signals in the working buffer 11, the control unit 16 controls the system so that three-plate signals are transferred to the signal processing unit 14.

Next, one example of the configuration of the separation unit 51 will be described with reference to FIG. 10 (A).

The separation unit 51 shown in the example comprises: an extraction unit 61 constituting extraction means for sequentially extracting regions of a predetermined size from the image data stored in the image buffer 6; a region buffer 62 which stores the image data of the regions extracted by the extraction unit 61; an edge extraction unit 63 constituting edge calculation means for calculating the edge components of the regions stored in the region buffer 62; an image signal separation unit 64 constituting image signal separation means which compares the edge components calculated by the edge extraction unit 63 with a threshold value, counts the total number of effective edge components that are equal to or grater than the threshold value, judges that the region in question is an edge region in cases where the total number is equal to or greater than half of the number for the region as a whole, judges that the region in question is a flat region in cases where the total number is less than half of the above-mentioned number for the region as a whole, outputs the judgment results to the adjustment unit 52, and also outputs the results to a transfer unit 65 (described later); and a transfer unit 65 constituting image signal separation means which transfers the original signal from the region buffer 62 to the first interpolating unit 10 in cases where the judgment performed by the image signal separation unit indicates that the region in question is a flat region, and transfers the original signal from the region buffer 62 to the second interpolating unit 13 in cases where the region is an edge region.

Furthermore, the control unit 16 is bidirectionally connected with the extraction unit 61, edge extraction unit 63, image signal separation unit 64 and transfer unit 65, and controls these units.

Next, the operation of the separation unit 51 will be described.

Under the control of the control unit 16, the extraction unit 61 sequentially extracts in units of a block region of a predetermined size (e.g., 8×8 pixels) from the image buffer 6, and transfers these block regions to the region buffer 62.

Since edge extraction processing in the after-stage is performed in 2×2 pixel positions in the central portions of the respective regions, the system is devised such that when the extraction unit 61 extracts regions having a size of 8×8 pixels, sequential extractions are performed while the X direction position or Y direction positions is shifted two pixels at a time so that six pixels each are duplicated in the x direction or Y direction.

Under the control of the control unit 16, the edge extraction unit 63 calculates edge components according to the respective signals RGB for the 2×2 pixels in the central portions of the regions constituting the original signals stored in the region buffer 62.

The edge component calculation method using the edge extraction unit 63 will be described with reference to FIG. 11.

The edge components are calculated by taking the absolute values in the four directions up, down, left and right for the R and B signals, and in the four diagonal directions at 45° in the case of the G signal.

First, in the case of the R signal, as is shown in FIG. 11 (A), the absolute values of the differences between the respective signals R0, R3, R1 and R2 that are separated from the pixel of interest by a space of one pixel in the up, down, left and right directions are as shown in the following Equation (43):

$E0 = |R - R0|$ $E1 = |R - R1|$ $E2 = |R - R2|$ $E3 = |R - R3|$                                           <Equation (43)>

Furthermore, in the case of the G signal, as is shown in FIG. 11 (B), the absolute values of the differences between the respective signals G0, G1, G2 and G3 that are positioned on the upper left, upper right, lower left and lower right with respect to the pixel of interest are as shown in the following Equation (44):

$E0=|G-G0|$ $E1=|G-G1|$ $E2=|G-G2|$ $E3=|G-G3|$ <Equation (44)>

Moreover, in regard to the B signal, as is shown in FIG. 11 (C), the absolute values of the differences between the respective signals B0, B3, B1 and B2, which are separated from the pixel of interest by one pixel in the up, down, left and right directions, are as shown in the following Equation (45).

$E0=|B-B0|$ $E1=|B-B1|$ $E2=|B-B2|$ $E3=|B-B3|$ <Equation (45)>

Thus, since the calculation of edge components in four directions is respectively performed for 2×2 pixels, i.e., four pixels, in the central portion, a total of 16 types of edge components are determined.

The edge components thus determined by the edge extraction unit 63 are transferred to the image signal separation unit 64.

The image signal separation unit 64 compares the received edge components with a predetermined threshold value, e.g., 256 in cases where the output width of the A/D converter 5 is 12 bits, and designates edge components that are equal to or greater than the threshold value as effective edge components.

In cases where the total number of effective edge components is more than half of all the edge components, i.e., in cases where the total number of effective edge components is 8 or greater (since the total number of edge components is 16 in the example described above), the region in question is judged to be an edge region. On the other hand, in cases where the total number of effective edge components is less than half of all the edge components (i.e., in cases where the total number of effective edge components is 7 or less), the region is judged to be a flat region.

The judgment results obtained by the image signal separation unit 64 are transferred to the adjustment unit 52, and are also transferred to the transfer unit 65.

In cases where the judgment results sent from the image signal separation unit 64 indicate that the region is a flat region, the transfer unit 65 transfers the original signal from the region buffer 62 to the first interpolating unit 10; on the other hand, in cases where these results indicate that the region is an edge region, the transfer unit 65 transfers the original signal to the second interpolating unit 13.

The control unit 16 controls the separation unit 51 such that the abovementioned processing is performed for all of the original signals in the image buffer 6.

Next, one example of the configuration of the first interpolating unit 10 will be described with reference to FIG. 12.

The first interpolating unit 10 comprises: an extraction unit 71 constituting extraction means for sequentially extracting regions of a predetermined size of the image signals from the separation unit 51; a region buffer 72 which stores the image data of the regions extracted by the extraction unit 71; an RB linear interpolating unit 73 constituting calculation means for interpolating the dropped-out R signals and B signals in the regions stored in the region buffer 72 by universally known linear interpolation, and outputting these signals to the working buffer 11; and a G cubic interpolating unit 74 constituting calculation means for interpolating the dropped-out G signals for the regions stored in the region buffer 72 by universally known cubic interpolation, and outputting these signals to the working buffer 11.

Furthermore, the control unit 16 is bidirectionally connected with the extraction unit 71, RB linear interpolating unit 73 and G cubic interpolating unit 74, and controls these units.

Next, the operation of the first interpolating unit 10 will be described.

Under the control of the control unit 16, the extraction unit 71 extracts in units of a block region of a predetermined size (e.g., 8×8 pixels) from the separation unit 51, and transfers these block regions to the region buffer 72.

The RB linear interpolating unit 73 calculates the dropped-out R and B signals for 2×2 pixels in the central portions of the 8×8 pixel regions stored in the region buffer 72 by universally known linear interpolation processing, and outputs these signals to the working buffer 11.

Meanwhile, the G cubic interpolating unit 74 calculates the dropped-out G signals for 2×2 pixels in the central portions of the 8×8 pixel regions stored in the region buffer 72 by universally known cubic interpolation processing, and outputs these signals to the working buffer 11.

Next, one example of the configuration of the verification unit 12 will be described with reference to FIG. 13.

The verification unit 12 comprises: an extraction unit 81 constituting extraction means for sequentially extracting regions of a predetermined size from the image data in a three-plate state stored in the abovementioned working buffer 11; a region buffer 82 which stores the image data of the regions extracted by the extraction unit 81; a hue calculation unit 83 constituting hue calculation means for calculating the hue classes of the regions stored in the region buffer 82 on the basis of the size relationships of the RGB values; a coefficient buffer 84 which stores coefficients indicating the hue classes calculated by the hue calculation unit 83; and a hue verification unit 85 constituting hue verification means for investigating the distribution conditions of the hue classes on the basis of the coefficients stored in the coefficient buffer 84, judging whether or not the region in question is a single-hue region or a multi-hue region, and outputting these verification results to the abovementioned adjustment unit 52.

Furthermore, the control unit 16 is bidirectionally connected with the abovementioned extraction unit 81, hue calculation unit 83 and hue verification unit 85, and controls these units.

Next, the operation of the verification unit 12 will be described.

Under the control of the control unit 16, the extraction unit 81 sequentially extracts regions of a predetermined size (e.g., 8×8 pixels) from the working buffer 11, and transfers these regions to the region buffer 82.

Under the control of the control unit 16, the hue calculation unit 83 calculates the hue classes on the basis of the size relationships of the RGB values for the respective pixels of the regions stored in the region buffer 82.

The hue classes classified into 13 classes in accordance with the size relationships of the RGB values will be described with reference to FIG. 14.

As is shown in the figure, the respective classes correspond to the following size relationships: namely, class 0 indicates that R=G=B, class 1 indicates that B>R>G, class 2 indicates that R=B>G, class 3 indicates that R>B>G, class 4 indicates that R>G=B, class 5 indicates that R>G>B, class 6 indicates that R=G>B, class 7 indicates that G>R>B, class 8 indicates that G>R=B, class 9 indicates that G>B>R, class 10 indicates that G=B>R, class 11 indicates that B>G>R, and class 12 indicates that B>R=G.

Furthermore, in calculating the size relationships of the RGB values, the hue calculation unit 83 determines the hue class by investigating the size relationships of the RGB values shown in FIG. 12 after dividing by a predetermined coefficient used to eliminate the effects of slight variations, e.g., 32 in a case where the output width of the A/D converter 5 is 12 bits. Such division by 32 is equivalent to a determination of the hue class on the basis of the upper 7 bits of data since removing the lower 5 bits of the 12 bits of data equals to the division by 32.

The classification results based on the hue classes thus determined are transferred to the coefficient buffer 84 and stored.

Under the control of the control unit 16, the hue verification unit 85 investigates the distribution conditions of the hue classes stored in the coefficient buffer 84, and judges whether the region in question is a single-hue region or a multi-hue region. The judgment is performed by considering the region to be a single-hue region in cases where a predetermined proportion or more (e.g., 70%) of the region size is constructed by a single hue class (or the like).

In concrete terms, since regions having a size of 8×8 pixels are envisioned in the abovementioned example, there are 64 pixels that are classified into hue classes; accordingly, the region is judged to be a single-hue region in cases where 45 pixels (70% of the pixels) or more are constructed by the same hue class, and is judged to be a multi-hue region in cases where less than 45 pixels are constructed by the same hue class.

The judgment results obtained by the hue verification unit 85 are transferred to the abovementioned adjustment unit 52.

Furthermore, in the above description, the separation unit 51 is a unit that performs separation of the original signals on the basis of edge information. However, the present invention is not necessarily limited to such a configuration; for example, this unit may also be a unit of the type that uses correlation information such as that shown in FIG. 10 (B).

Another example of the configuration of the separation unit 51 will be described with reference to FIG. 10 (B). The basic configuration of the separation unit 51 shown in FIG. 10 (B) is substantially similar to that of the separation unit 51 shown in the abovementioned FIG. 10 (A); accordingly, the same constituent elements are labeled with the same symbols, and a description of such elements is omitted.

In the separation unit 51 shown in FIG. 10 (B), the edge extraction unit 63 in the separation unit 51 shown in the abovementioned FIG. 10 (A) is substituted by a correlation calculation unit 66 that constitutes correlation calculation means; this is the main part that is different.

The abovementioned correlation calculation unit 66 causes a regression of the correlation relationships between the respective color signals in the regions read in from the region buffer 62 to the linear equation as shown in Equation (42) of the abovementioned first embodiment. Then, the correlation calculation unit 66 transfers the constant terms in the linear equation to the abovementioned image signal separation unit 64.

The image signal separation unit 64 compares the absolute values of the abovementioned constant terms with a predetermined threshold value to judge the region in question to be a single-hue region in cases where these values are less than the threshold value, and to judge the region in question to be a multi-hue region in cases where these values are equal to or greater than the threshold value. Then, the image signal separation unit 64 transfers these judgment results to the abovementioned adjustment unit 52, and also transfers these results to the transfer unit 65.

In cases where the judgment results sent from the image signal separation unit 64 indicate that the region is a multi-hue region, the transfer unit 65 transfers the original signal from the abovementioned region buffer 62 to the first interpolating unit 10; on the other hand, in cases where these results indicate that the region is a single-hue region, the transfer unit 65 transfers the original signal to the second interpolating unit 13.

Furthermore, processing by means of hardware is assumed in the above description. However, the present invention is not necessarily limited to such a configuration; for example, it would also be possible to output the signal from the CCD 4 taken as raw data in an unprocessed state and information such as the image size, the filter information and so on added to the raw data as header information, and to perform processing by means of an image processing program constituting separate software in an external computer or the like.

Interpolation processing using an image processing program will be described with reference to FIG. 15.

As is shown in FIG. 15 (A), when the processing is started, the original signal (constituting raw data) and header information are first read in (step S31).

Then, the original signal is extracted in units of a block region having a predetermined size (step S32), and edge components for a plurality of directions are extracted as shown in FIG. 11 (step S33).

Next, the total number of the abovementioned edge components is output and stored as separation information for the purpose of judging whether the region in question is a flat region or an edge region (step S34).

Subsequently, a judgment as to whether the region in question is a flat region or an edge region is made by comparing a predetermined threshold value Th and the total number of edge components (step S35).

Here, in cases where the total number of edge components is less than the threshold value Th so that the region is judged to be a flat region, the processing proceeds to step S42 described later (see FIG. 15 (B)), the processing up to step S45 (described later) is performed, and the processing then proceeds to the next step S36.

On the other hand, in cases where the total number of edge components is equal to or greater than the threshold value Th so that the region is judged to be an edge region, the processing proceeds to step S46 described later (see FIG. 15 (C), the processing up to step S48 (described later) is performed, and the processing then proceeds to the next step S36.

Then, a judgment is made as to whether or not extraction has been completed in all of the block regions corresponding to all of the signals (step S36), and in cases where this processing has not been completed, the processing returns to the abovementioned step S32, and the extraction of the next block region is performed.

On the other hand, in cases where the extraction of all of the blocks has been completed, the signals following the interpolation processing are extracted in units of a block region having a predetermined size (step S37), a hue map is calculated by classifying the hue into the 13 classes shown in FIG.

14, and it is determined whether the block regions in question are single-hue regions or multi-hue regions (step S38).

Here, the separation information relating to flat regions or edge regions that is output in the abovementioned step S34 is input, and is transferred to the processing of the next step S40 (step S39).

Then, on the basis of the hue information calculated in the abovementioned step S38 and the separation information transferred in the step S39, a selection is made as to whether or not interpolation processing is to be performed again, and in cases where this processing is to be performed, a selection is made as to whether the interpolation processing shown in FIG. 15 (B) or the interpolation processing shown in FIG. 15 (C) is to be performed (step S40).

Specifically, in the case of a "flat region and multi-hue region" and in the case of an "edge region and single-hue region", which do not require that interpolation processing be performed again, the processing proceeds to the next step S41, while in the case of an "edge region and multi-hue region", the processing proceeds to step S42 described later (see FIG. 15 (B), the processing up to step S45 is performed, and the processing then proceeds to the next step S41. Furthermore, in the case of a "flat region and single-hue region", the processing proceeds to step S46 described later (see FIG. 15 (C)), the processing up to step S48 is performed, and the processing then proceeds to the next step S41.

Then, a judgment is made as to whether or not extraction has been completed for all of the block regions corresponding to all of the signals (step S41), and in cases where the extraction has not been completed, the processing returns to the abovementioned step S37, and the next block is extracted. On the other hand, in cases where the extraction has been completed, the processing is ended.

Next, the interpolation processing of steps S42 through S45 shown in FIG. 15 (B) will be described.

When this interpolation processing is started, block regions of a predetermined size are first extracted from the original signal (step S42).

Then, the dropped-out R and B signals are calculated by linear interpolation processing (step S43), and the dropped-out G signal is calculated by cubic interpolation processing (step S44).

Subsequently, the original signal and interpolation signals are combined and output (step S45), and the processing returns to the processing shown in the abovementioned FIG. 15 (A).

Next, the interpolation processing of steps S46 through S48 shown in FIG. 15 (C) will be described.

When this interpolation processing is started, block regions of a predetermined size are first extracted from the original signal (step S46).

Then, on the basis of Equation (42) of the abovementioned first embodiment, correlation relationships are determined as a linear equation, and the dropped-out color signals are calculated on the basis of the determined linear equation (step S47).

Subsequently, the original signal and interpolation signals are combined and output (step S48), and the processing returns to the processing of the abovementioned FIG. 15 (A).

Furthermore, in the above description, processing is always performed using a combination of first interpolation processing and second interpolation processing; however, the present invention is not limited to this. For example, it would also be possible to devise the system such that only the two types of interpolation processing based on the separation results from the original signal are performed via the external I/F unit 17, and repeated interpolation processing is not performed. In this case, it is sufficient if the control unit 16 controls the system such that the operation of the verification unit 12 and the operation of the adjustment unit 52 are stopped. When the control unit 16 judges whether or not to stop these operations, the control unit 16 acquires at least one type of information selected from a set comprising image quality information relating to the image quality of the image signals such as compression rate, image size or the like, image pickup mode information that is set in the image pickup system such as character image pickup, movie image pickup or the like, and interpolation processing switching information that can be manually set by the user, and performs the judgment on the basis of one or more types of such information.

Furthermore, in the above description, a configuration is described in which linear interpolation or cubic interpolation is performed as the first interpolation processing. However, the present invention is not limited to this. For example, it would also be possible to use a configuration in which interpolation processing based on edge directions or the like is performed in the same manner as in the first interpolation processing in the abovementioned first embodiment. However, the invention is not limited to this; it would also be possible to perform first interpolation processing having arbitrary characteristics that differ from those of the second interpolation processing. In other words, it is sufficient if the first interpolation processing and second interpolation processing form a combination of mutually different characteristics.

Furthermore, in the above description, a primary color Bayer type single-plate CCD is described as an example; however, the present invention is not limited to this. For example, a similar application is possible in the case of a single-plate CCD equipped with complementary color filters, and the present invention can also be applied to two-plate type image pickup systems or three-plate type image pickup systems in which pixel shifting is performed.

In the second embodiment, effects that are substantially the same as those of the abovementioned first embodiment can be obtained; furthermore, since interpolation is performed by adaptively combining first interpolation processing and second interpolation processing with mutually different characteristics, high-precision interpolation signals can be obtained overall.

Furthermore, since first interpolation processing and second interpolation processing are tentatively selected on the basis of the original signal, and interpolation processing is performed again after performing a fine precision verification on the basis of the original signal and the interpolation signals, the regions in which interpolation processing is performed again can be reduced, so that the processing speed can be increased.

Furthermore, in order to match the visual sensory characteristics, the G signal which is close to the luminance signal is processed by cubic interpolation, and the R and B signals constituting the other color signals are processed by linear interpolation, thus, high-speed interpolation processing can be performed while suppressing a drop in the image quality overall.

Furthermore, since hue information is determined by signals in a three-plate state combining the original signal and interpolation signals with no dropped-out color signals, a precision verification can be performed highly accurately. Moreover, since the calculation of this hue information requires only a small amount of calculation, high-speed processing can be performed.

In addition, since the separation of the original signal is performed on the basis of edge information or correlation information, appropriate processing can be performed at a high speed. Since this edge information is highly compatible with interpolation methods using edge directions, this method offers the advantage of being suitable for switching control between an interpolation method using edge directions and another interpolation method. Meanwhile, since the correlation information is highly compatible with interpolation methods using correlation information, such a correlation method offers the advantage of being suitable for switching control between an interpolation method using color correlations and another interpolation method.

If necessary, furthermore, it would also be possible to shorten the processing time and reduce the power consumption by performing only two types of interpolation processing based on the separation results from the original signal, without performing interpolation processing again. Here, since the system is devised such that information is obtained in cases where high-precision interpolation is unnecessary because of a high compression, or in cases where high-speed processing is given priority as in movie image acquisition or the like, control as to whether or not interpolation processing is performed again can be automated, so that the operability is improved. Furthermore, since the interpolation processing can be manually switched in accordance with the wishes of the user, the degree of flexibility with respect to processing is increased.

Figure 16:
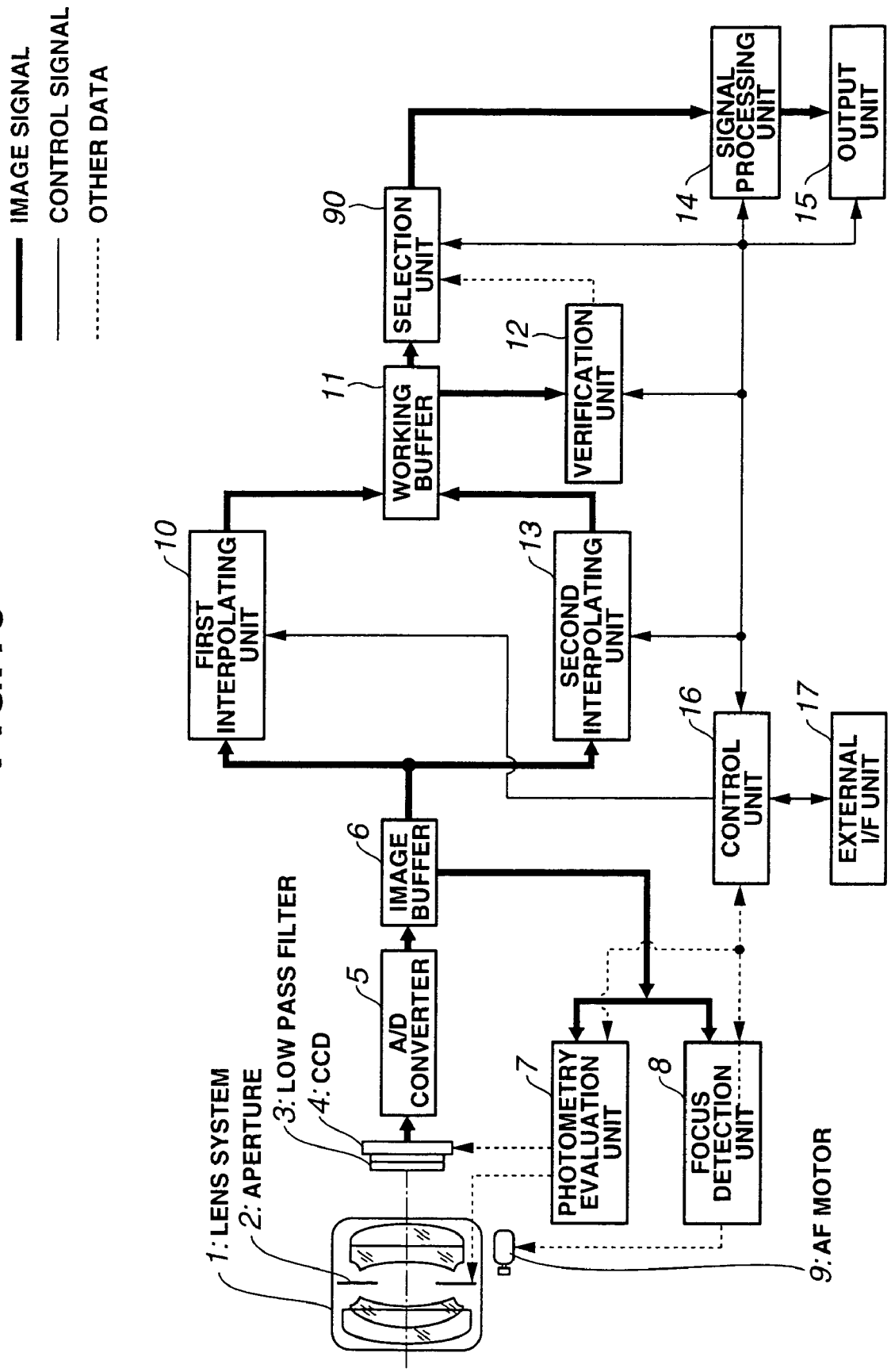
FIG. 16 is a block diagram which shows the configuration of the image pickup system in a third embodiment of the present invention.
Figure 17:
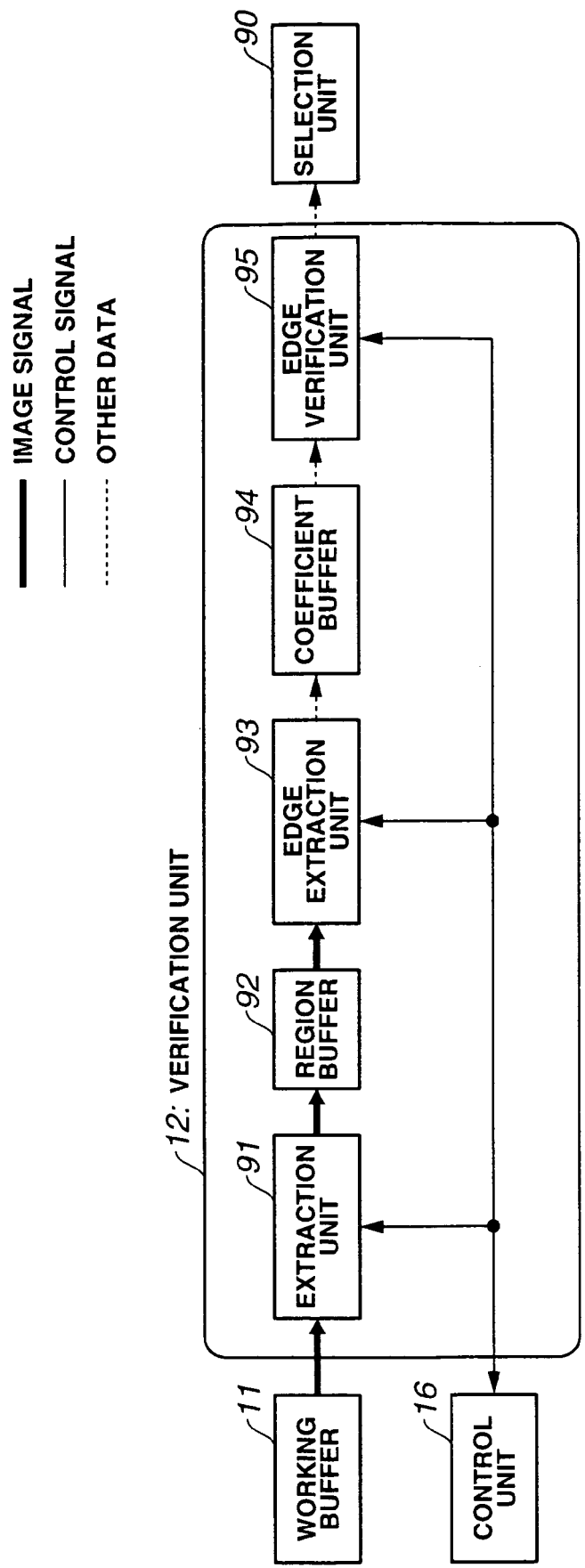
FIG. 17 is a block diagram which shows the configuration of a verification unit in the third embodiment.
Figure 18:
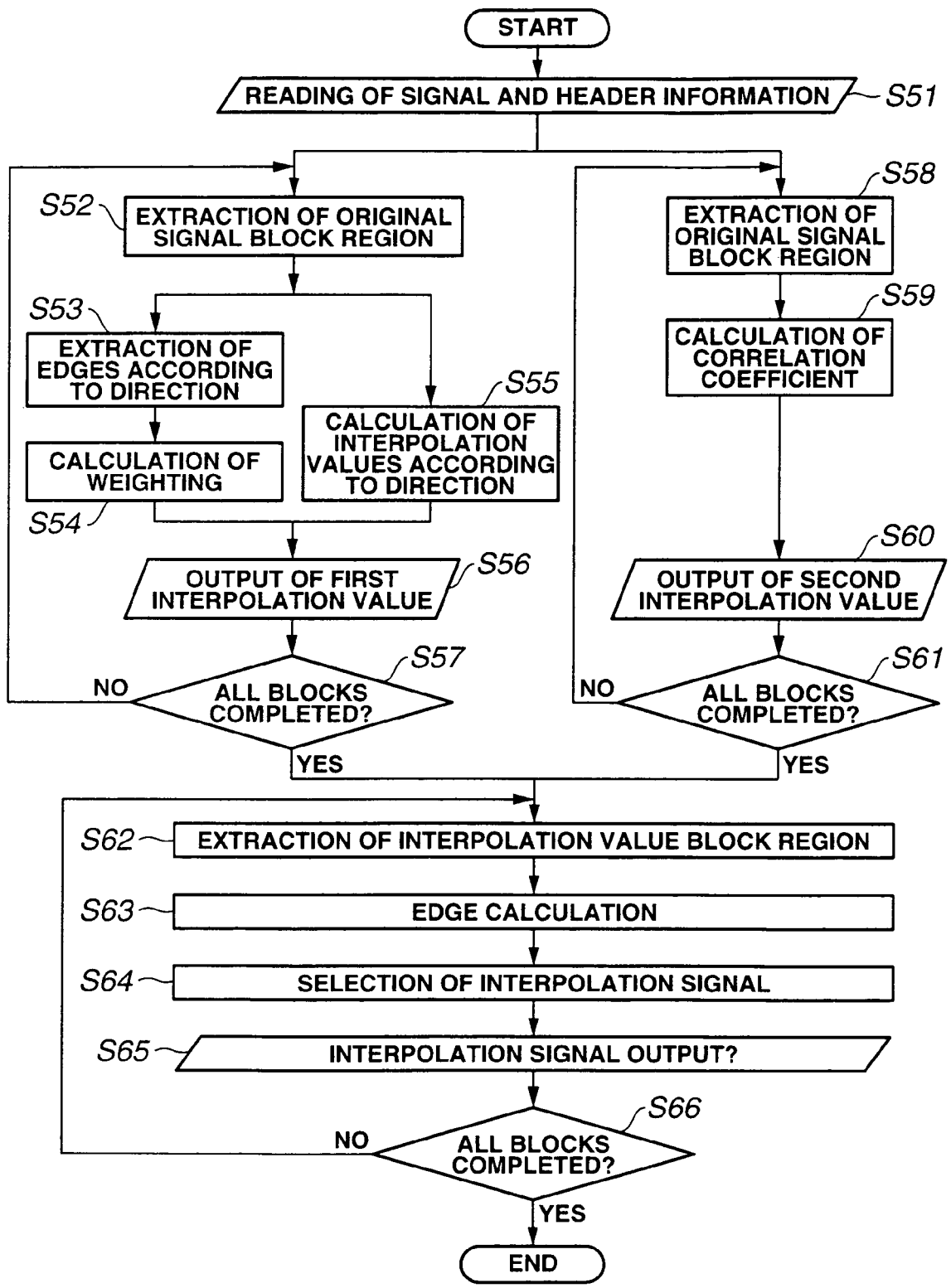
FIG. 18 is a flow chart showing the interpolation processing according to the image processing program in the third embodiment.

FIGS. 16 through 18 show a third embodiment of the present invention. FIG. 16 is a block diagram showing the configuration of the image pickup system, FIG. 17 is a block diagram showing the configuration of the verification unit, and FIG. 18 is a flow chart showing interpolation processing based on an image processing program.

In the third embodiment, parts that are the same as in the abovementioned first and second embodiments are labeled with the same symbols, and a description of such parts is omitted. For the most part, only points that are different are described.

As is shown in FIG. 16, the image pickup system in the third embodiment has a configuration in which a selection unit 90 constituting selection means is added to the configuration of the abovementioned first embodiment.

The selection unit 90 is a unit which selects either the interpolation signals of the first interpolating unit 10 or interpolation signals of the second interpolating unit 13 stored in the abovementioned working buffer 11 on the basis of the verification results obtained by the abovementioned verification unit 12, and outputs these signals to the signal processing unit 14.

Accordingly, in the third embodiment, the verification unit 12 outputs the verification results to the selection unit 90 instead of to the second interpolating unit 13.

Furthermore, the working buffer 11 outputs interpolation signals to the verification unit 12, and outputs such signals to the selection unit 90 instead of to the signal processing unit 14.

The basic configurations of other parts are substantially the same as in the abovementioned first embodiment.

Furthermore, the control unit 16 is also bidirectionally connected with the selection unit 90 that is added in the third embodiment, and controls the selection unit 90.

The operation of the image pickup system is basically the same as that of the abovementioned first embodiment; for the most part, therefore, only parts that are different will be described according to the flow of signals with reference to FIG. 16.

Under the control of the control unit 16, image signals stored in the image buffer 6 are independently subjected to interpolation processing by the first interpolating unit 10 and second interpolating unit 13. In regard to the respective interpolation processing operations performed in this case, as in the first embodiment described above, the first interpolating unit 10 performs interpolation processing based on edge directions, and the second interpolating unit 13 performs interpolation processing based on color correlations.

The interpolation signals produced by the first interpolating unit 10 and the interpolation signals produced by the second interpolating unit 13 are respectively transferred to the working buffer 11, and are independently stored without being overwritten.

After the interpolation processing has been completed for all of the signals, the control unit 16 sequentially transfers the three-plate signals stored in the working buffer 11 to the verification unit 12 in units of predetermined local region (e.g., 8×8 pixels). The three-plate signals in this case are pairs of three-plate signals comprising the original signals and the interpolation signals produced by the first interpolating unit 10, and three-plate signals comprising the original signals and the interpolation signals produced by the second interpolating unit 13

The verification unit 12 determines the luminance signals from the RGB three-plate signals, and calculates the edge components in pixel units by universally known Laplacian processing or the like. Then, the verification unit 12 determines the total number of effective edge components within the local region by taking edge components that are equal to or greater than a predetermined threshold value as effective edge components. Here, in cases where the abovementioned total number differs between the interpolation signals produced by the first interpolating unit 10 and the interpolation signals produced by the second interpolating unit 13, the abovementioned verification unit 12 selects whichever total number is greater. In this way, the verification unit 12 transfers the total number of effective edge components to the selection unit 90 as selection information.

Under the control of the control unit 16, the selection unit 90 selects either the interpolation signals produced by the first interpolating unit 10 or the interpolation signals produced by the second interpolating unit 13, using the total number of effective edge components selected by the verification unit 12. Specifically, in cases where the total number of effective edge components is equal to or greater than a predetermined threshold value, the selection unit 90 takes the region to be an edge region, and selects the interpolation signals produced by the first interpolating unit 10, while in cases where the total number of effective edge components is less than the predetermined threshold value, the selection unit 90 takes the region to be a flat region, and selects the interpolation signals produced by the second interpolating unit 13.

The control unit 16 controls the system such that verification by the verification unit 12 and selection by the selection unit 90 are performed for all of the signals in the working buffer 11, and sequentially transfers the selected signals to the signal processing unit 14.

Next, one example of the verification unit 12 will be described with reference to FIG. 17.

The verification unit 12 comprises: an extraction unit 91 constituting extraction means for sequentially extracting regions of a predetermined size from the image data stored in the abovementioned working buffer 11; a region buffer 92 which stores the image data of the regions extracted by the extraction unit 91; an edge extraction unit 93 constituting edge extraction means for extracting the edge components of the regions stored in the region buffer 92; a coefficient buffer 94 which stores the edge components calculated by the edge extraction unit 93; and an edge verification unit 95 constituting edge verification means which compares the edge components stored in the coefficient buffer 94 with a predetermined threshold value, determines the total number of effective edge components that are equal to or greater than the threshold value, and outputs whichever total number is larger between the total number based on the interpolation signals produced by the first interpolating unit 10 and the total number based on the interpolation signals produced by the second interpolating unit 13 to the selection unit 90 as selection information.

Furthermore, the control unit 16 is bidirectionally connected with the abovementioned extraction unit 91, edge extraction unit 93 and edge verification unit 95, and controls these units.

Next, the operation of the verification unit 12 will be described.

Under the control of the control unit 16, the extraction unit 91 sequentially extracts regions of a predetermined size (e.g., a size of 8×8 pixels) from the working buffer 11, and transfers these regions to the region buffer 92.

Under the control of the control unit 16, the edge extraction unit 93 calculates the luminance signal Y from the RGB signal values as shown in the following Equation (46) for the respective pixels of the regions stored in the region buffer 92.

$$Y=0.299R+0.587G+0.114B \qquad \text{<Equation (46)>}$$

Furthermore, the edge extraction unit 93 determines the edge component for the calculated luminance signal Y by performing universally known Laplacian processing. Since the Laplacian processing in this case is performed using a 3×3 filter, the edge component is obtained as 6×6 pixels in the central portion of the 8×8 pixel region. Accordingly, when the extraction unit 91 extracts regions having a size of 8×8 pixels, the X direction position or Y direction position is shifted six pixels at a time, so that sequential extractions are performed while duplicating two pixels at a time in the X direction or Y direction.

The edge components in 6×6 pixels thus obtained are transferred from the edge extraction unit 93 to the coefficient buffer 94.

Under the control of the control unit 16, the edge verification unit 95 sequentially reads in the edge components stored in the coefficient buffer 94, compares these edge components with a predetermined threshold value, e.g., 256 in a case where the output width of the abovementioned A/D converter 5 is 12 bits, and considers edge components that are equal to or greater than the threshold value to be effective edge components. The edge verification unit 95 determines the total number of edge components thus judged to be effective edge components.

Under the control of the control unit 16, the processing in the edge verification unit 95 is respectively performed for pairs of the original signals and interpolation signals produced by the first interpolating unit 10, and for pairs of the original signals and interpolation signals produced by the second interpolating unit 13, that are stored in the working buffer 11.

The edge verification unit 95 transfers whichever total number is largest among the total numbers of effective edge components thus obtained to the selection unit 90 as selection information.

Furthermore, in the above description, processing by means of hardware is assumed. However, the present invention is not necessarily limited to such a configuration; for example, it would also be possible to output the signal from the CCD 4 taken as raw data in an unprocessed state and information such as the image size, the filter information and so on added to the raw data as header information, and to perform processing by means of an image processing program constituting separate software in an external computer or the like.

Interpolation processing using an image processing program will be described with reference to FIG. 18.

When the processing is started, the original signal (constituting raw data) and header information are first read in (step S51).

Then, the original image is extracted in units of a block region having a predetermined size (step S52), edge components for a plurality of directions are extracted as shown in FIG. 4 used for the abovementioned first embodiment (step S53), and weighting coefficients according to the respective directions are calculated (step S54).

Furthermore, for the block regions extracted in the abovementioned step S52, interpolated values of the color difference signals according to the respective directions are determined (step S55).

Thus, the final interpolation signals are calculated on the basis of the weighting coefficients determined in the abovementioned step S54 and the interpolated values determined in the abovementioned step S55, and are output (step S56).

Next, a judgment is made as to whether or not extraction has been completed for all of the block regions corresponding to all of the signals (step S57). In cases where the extraction has not been completed, the processing returns to the abovementioned step S52, and extraction of the next block region is performed, while in cases where the extraction has been completed, the processing proceeds to step S62 described later.

Meanwhile, the original signal read in in the abovementioned step S51 is extracted in units of a block region having a predetermined size (step S58), the correlation relationships between the color signals are determined as a linear equation as shown in Equation (42) for the abovementioned first embodiment (step S59), interpolation signals are calculated on the basis of the linear equation thus determined, and these signals are output (step S60).

Subsequently, a judgment is made as to whether or not extraction has been completed for all of the block regions corresponding to all of the signals (step S61); in cases where the extraction has not been completed, the processing returns to the abovementioned step S58, and the extraction of the next block region is performed, while in cases where the extraction has been completed, the processing proceeds to step S62 described later.

Then, the original signals, the interpolation signals output in the abovementioned step S56 and the interpolation signals output in the abovementioned step S60 are extracted in units of a block region having a predetermined size (step S62), and the total number of effective edge components is calculated (step S63).

Next, on the basis of the calculated total number, selection information for the purpose of selecting either the interpolation signals output in the abovementioned step S56 or the interpolation signals output in the abovementioned step S60 is determined, and selection of the interpolation signals is performed on the basis of the determined selection information (step S64).

The interpolation signals thus selected are output (step S65), and a judgment is made as to whether or not extraction has been completed for all of the block regions corresponding to all of the signals (step S66). In cases where the extraction has not been completed, the processing returns to the abovementioned step S62, and the extraction of the nest block region is performed, while in cases where the extraction has been completed, the processing is ended.

Furthermore, in the above description, processing is always performed using a combination of first interpolation processing and second interpolation processing; however, the present invention is not limited to this. For example, it would also be possible to select only one type of interpolation processing via the external I/F unit 17. In this case, it is sufficient that the control unit 16 controls the system such that the operation of the verification unit 12 and the operation of the second interpolating unit 13 are stopped, and that the selection unit 90 is caused to select only the interpolation signals produced by the first interpolating unit 10. When the control unit 16 judges whether or not to stop these operations, the control unit 16 acquires at least one type of information selected from the following, i.e., image quality information relating to the image quality of the image signals such as compression rate, image size or the like; image pickup mode information that is set in the image pickup system such as character image pickup, movie image pickup or the like; and interpolation processing switching information that can be manually set by the user; and performs the judgment on the basis of one or more types of such information.

Furthermore, in the above description, a primary color Bayer type single-plate CCD is described as an example; however, the present invention is not limited to this. For example, a similar application is possible in the case of a single-plate CCD equipped with complementary color filters, and the present invention can also be applied to two-plate type image pickup systems or three-plate type image pickup systems in which pixel shifting is performed.

In the third embodiment, effects that are substantially the same as in the abovementioned first and second embodiments can be obtained; furthermore, since interpolation is respectively performed by both first interpolation processing based on edge directions and second interpolation processing based on color correlations, and one of these is adaptively selected by verifying the precision, high-precision interpolation signals as a whole can be obtained.

Furthermore, since the precision is verified using three types of signals, i.e., the original signals, first interpolation signals and second interpolation signals, and a a selection is performed on the basis of these verification results, adaptive high-precision control can be performed, so that high-quality interpolation signals can be obtained. In this case, since verification is performed on the basis of edge information, the precision can be improved. Since the edge information is highly compatible with interpolation methods using edge directions, this method offers the advantage of being suitable for switching control between an interpolation method using edge directions and another interpolation method.

If necessary, furthermore, the control unit 16 controls the system such that the operation of the second interpolation processing 13 and the operation of the verification unit 12 are stopped, and only the first interpolation processing signals are selected, thus making it possible to shorten the processing time and reduce the power consumption. Here, since the system is devised such that information is obtained in cases where high-precision interpolation is unnecessary because of a high compression, or in cases where high-speed processing is given priority as in movie image acquisition or the like, control as to whether or not interpolation processing is performed a second time can be automated, so that the operability is improved. Furthermore, since the interpolation processing can be manually switched in accordance with the wishes of the user, the degree of flexibility with respect to processing is increased.

Furthermore, the present invention is not limited to the embodiments described above; it goes without saying that various modifications and applications are possible within limits that involve no departure from the spirit of the invention.

Furthermore, modifications or the like made by partially combining the respective embodiments described above also belong to the present invention.

Moreover, the present invention is not limited to the abovementioned embodiments; it goes without saying that various modifications and applications are possible within limits that involve no departure from the spirit of the present invention.

INDUSTRIAL APPLICABILITY

In the present invention, as is described above, color signals dropped-out in image signals can be interpolated with a higher degree of precision.

CROSS-REFERENCE TO RELATED APPLICATION

The present application is based on the priority of Japanese Patent Application No. 2003-13863 filed in Japan on Jan. 22, 2003. The disclosure is referred to the description, claims, and drawings of the present application.

The invention claimed is:

1. An image pickup system for processing an image signal at each pixel which comprises a plurality of color signals, and one or more of the color signals are dropped out according to a location of the pixel, the image pickup system comprising:
   first interpolation means for interpolating the color signals dropped-out from the image signals by a first interpolation method;
   precision verification means for verifying the interpolation precision based on the image signals and the color signals interpolated by the first interpolation means; and
   second interpolation means for interpolating the color signals dropped-out from the image signals by a second interpolation method that is different from the first interpolation method in cases where it is judged that the interpolation precision by the first interpolation method is insufficient.

2. The image pickup system according to claim 1, wherein the first interpolation means or second interpolation means comprises:
   extraction means for extracting regions of a predetermined size centered on pixels of interest from the image signals,
   edge extraction means for extracting a plurality of edge intensities relating to predetermined directions from the pixels of interest within the extracted regions,
   weighting calculation means for calculating weighting coefficients that are normalized from the extracted edge intensities,
   interpolation signal calculation means for calculating a plurality of interpolation signals relating to predetermined directions from the pixels of interest within the extracted regions, and
   calculation means for calculating the dropped-out color signals in the pixels of interest based on a plurality of weighting coefficients relating to the predetermined directions and a plurality of interpolation signals relating to the predetermined directions.

3. The image pickup system according to claim 1, wherein the first interpolation means or second interpolation means comprises:

extraction means for extracting regions of a predetermined size centered on pixels of interest from the image signals, and calculation means for calculating the dropped-out color signals in the pixels of interest within the extracted regions by linear interpolation or cubic interpolation.

4. The image pickup system according to claim 1, wherein the first interpolation means or second interpolation means comprises:

extraction means for extracting regions of a predetermined size centered on pixels of interest from the image signals, correlation calculation means for determining the correlation between the respective color signals within the extracted regions as a linear equation, and calculation means for calculating the dropped-out color signals based on the image signals and the correlation.

5. The image pickup system according to claim 1, wherein the precision verification means comprises:

correlation calculation means for determining correlation information relating to the correlations between the respective color signals for each predetermined region based on the image signals and the color signals interpolated by the first interpolation means, and correlation verification means for verifying the interpolation precision based on the correlation information.

6. The image pickup system according to claim 1, wherein the precision verification means comprises:

hue calculation means for determining hue information for each pixel based on the image signals and the color signals interpolated by the first interpolation means, and hue verification means for verifying the interpolation precision based on the hue information.

7. The image pickup system according to claim 1, wherein the precision verification means comprises:

edge calculation means for determining edge information for each predetermined region based on the image signals and the color signals interpolated by the first interpolation means, and edge verification means for verifying the interpolation precision based on the edge information.

8. The image pickup system according to claim 1, further comprising control means for controlling the precision verification means and the second interpolation means such that the operation of the precision verification means and the operation of the second interpolation means can be stopped.

9. The image pickup system according to claim 8, wherein the control means comprises:

information acquisition means for acquiring at least one type of information selected from a set comprising image quality information relating to the image quality of the image signals, image pickup mode information set in the image pickup system, and interpolation processing switching information that can be manually set, and judgment means for judging whether or not the operations are to be stopped based on at least one type of information selected from a set comprising the image quality information, image pickup mode information, and interpolation processing switching information.

10. An image pickup system for processing an image signal at each pixel which comprises a plurality of color signals, and one or more of the color signals are dropped out according to a location of the pixel, the image pickup system comprising:

separation means for separating the image signals into first image signals and second image signals based on predetermined characteristics relating to the image signals;

first interpolation means for interpolating the dropped-out color signals from the first image signals by a first interpolation method;

second interpolation means for interpolating the dropped-out color signals from the second image signals by a second interpolation method that is different from the first interpolation method;

precision verification means for verifying the interpolation precision based on the first image signals and the color signals interpolated by the first interpolation means for regions of the first image signals, and verifying the interpolation precision based on the second image signals and the color signals interpolated by the second interpolation means for regions of the second image signals; and adjustment means for causing interpolation processing of the dropped-out color signals to be performed again by the second interpolation means when insufficient interpolation was performed by the first interpolation means, and for causing interpolation processing of the dropped-out color signals to be performed again by the first interpolation means when insufficient interpolation was performed by the second interpolation means, in cases where it is judged that the interpolation precision is insufficient.

11. The image pickup system according to claim 10, wherein the separation means comprises:

edge calculation means for determining edge information for each predetermined region from the image signals, and image signal separation means for separating the image signals based on the edge information.

12. The image pickup system according to claim 10, wherein the separation means comprises:

correlation calculation means for determining correlation information relating to the correlations between the respective color signals for each predetermined region from the image signals, and image signal separation means for separating the image signals based on the correlation information.

13. The image pickup system according to claim 10, further comprising control means for controlling the precision verification means and the second interpolation means such that the operation of the precision verification means and the operation of the adjustment means can be stopped.

14. The image pickup system according to claim 10, wherein the first interpolation means or second interpolation means comprises:

extraction means for extracting regions of a predetermined size centered on pixels of interest from the image signals;

edge extraction means for extracting a plurality of edge intensities relating to predetermined directions from the pixels of interest within the extracted regions;

weighting calculation means for calculating weighting coefficients that are normalized from the extracted edge intensities;

interpolation signal calculation means for calculating a plurality of interpolation signals relating to predetermined directions from the pixels of interest within the extracted regions; and calculation means for calculating the dropped-out color signals in the pixels of interest based on a plurality of weighting coefficients relating to the predetermined directions and a plurality of interpolation signals relating to the predetermined directions.

15. The image pickup system according to claim 10, wherein the first interpolation means or second interpolation means comprises:
   extraction means for extracting regions of a predetermined size centered on pixels of interest from the image signals; and
   calculation means for calculating the dropped-out color signals in the pixels of interest within the extracted regions by linear interpolation or cubic interpolation.

16. The image pickup system according to claim 10, wherein the first interpolation means or second interpolation means comprises:
   extraction means for extracting regions of a predetermined size centered on pixels of interest from the image signals;
   correlation calculation means for determining the correlation between the respective color signals within the extracting regions as a linear equation; and
   calculation means for calculating the dropped-out color signals based on the image signals and the correlation.

17. The image pickup system according to claim 10, wherein the precision verification means comprises:
   correlation calculation means for determining correlation information relating to the correlations between the respective color signals for each predetermined region based on the image signals and the color signals interpolated by the first interpolation means, and
   correlation verification means for verifying the interpolation precision based on the correlation information.

18. The image pickup system according to claim 10, wherein the precision verification means comprises:
   hue calculation means for determining hue information for each pixel based on the image signals and the color signals interpolated by the first interpolation means, and
   hue verification means for verifying the interpolation precision based on the hue information.

19. The image pickup system according to claim 10, wherein the precision verification means comprises:
   edge calculation means for determining edge information for each predetermined region based on the image signals and the color signals interpolated by the first interpolation means, and
   edge verification means for verifying the interpolation precision based on the edge information.

20. The image pickup system according to claim 13, wherein the control means comprises:
   information acquisition means for acquiring at least one type of information selected from a set comprising image quality information relating to the image quality of the image signals, image pickup mode information set in the image pickup system, and interpolation processing switching information that can be manually set, and
   judgment means for judging whether or not the operations are to be stopped based on at least one type of information selected from a set comprising the image quality information, image pickup mode information, and interpolation processing switching information.

21. An image pickup system for processing an image signal at each pixel which comprises a plurality of color signals, and one or more of the color signals are dropped out according to a location of the pixel, the image pickup system comprising:
   first interpolation means for interpolating the color signals dropped-out from the image signals by a first interpolation method;
   second interpolation means for interpolating the color signals dropped-out from the image signals by a second interpolation method that is different from the first interpolation method;
   precision verification means for verifying the interpolation precision based on the image signals, the color signals interpolated by the first interpolation means and the color signals interpolated by the second interpolation means; and
   selection means for selecting color signals having a higher interpolation precision between the color signals interpolated by the first interpolation means and the color signals interpolated by the second interpolation means.

22. The image pickup system according to claim 21, further comprising control means for controlling the precision verification means and the second interpolation means such that the operation of the second interpolation means and the operation of the precision verification means can be stopped, and for controlling the selection means such that when the operation of the second interpolation means and the operation of the precision verification means are stopped, the selection means is caused to select only the color signals that are interpolated by the first interpolation means.

23. The image pickup system according to claim 21, wherein the first interpolation means or second interpolation means comprises:
   extraction means for extracting regions of a predetermined size centered on pixels of interest from the image signals;
   edge extraction means for extracting a plurality of edge intensities relating to predetermined directions from the pixels of interest within the extracted regions;
   weighting calculation means for calculating weighting coefficients that are normalized from the extracted edge intensities;
   interpolation signal calculation means for calculating a plurality of interpolation signals relating to predetermined directions from the pixels of interest within the extracted regions; and
   calculation means for calculating the dropped-out color signals in the pixels of interest based on a plurality of weighting coefficients relating to the predetermined directions and a plurality of interpolation signals relating to the predetermined directions.

24. The image pickup system according to claim 21, wherein the first interpolation means or second interpolation means comprises:
   extraction means for extracting regions of a predetermined size centered on pixels of interest from the image signals; and
   calculation means for calculating the dropped-out color signals in the pixels of interest within the extracted regions by linear interpolation or cubic interpolation.

25. The image pickup system according to claim 21, wherein the first interpolation means or second interpolation means comprises:
   extraction means for extracting regions of a predetermined size centered on pixels of interest from the image signals;
   correlation calculation means for determining the correlation between the respective color signals within the extracting regions as a linear equation; and
   calculation means for calculating the dropped-out color signals based on the image signals and the correlation.

26. The image pickup system according to claim 21, wherein the precision verification means comprises:

correlation calculation means for determining correlation information relating to the correlations between the respective color signals for each predetermined region based on the image signals and the color signals interpolated by the first interpolation means, and correlation verification means for verifying the interpolation precision based on the correlation information.

27. The image pickup system according to claim 21, wherein the precision verification means comprises:

hue calculation means for determining hue information for each pixel based on the image signals and the color signals interpolated by the first interpolation means, and hue verification means for verifying the interpolation precision based on the hue information.

28. The image pickup system according to claim 21, wherein the precision verification means comprises:

edge calculation means for determining edge information for each predetermined region based on the image signals and the color signals interpolated by the first interpolation means, and edge verification means for verifying the interpolation precision based on the edge information.

29. The image pickup system according to claim 22, wherein the control means comprises:

information acquisition means for acquiring at least one type of information selected from a set comprising image quality information relating to the image quality of the image signals, image pickup mode information set in the image pickup system, and interpolation processing switching information that can be manually set, and judgment means for judging whether or not the operations are to be stopped based on at least one type of information selected from a set comprising the image quality information, image pickup mode information, and interpolation processing switching information.

30. A method, for an image pickup system, for processing an image signal at each pixel which comprises a plurality of color signals, wherein the image pickup system comprises an image pickup element which outputs an image signal for each pixel from which one or more of the color signals are dropped out according to the location of the pixel, the method comprising:

interpolating, by a first interpolating unit of the image pickup system, the color signals dropped-out from the image signals by a first interpolation method;

verifying, by a verification unit of the image pickup system, the interpolation precision based on the image signals and the color signals interpolated by the first interpolating unit; and interpolating, by a second interpolating unit of the image pickup system, the color signals dropped-out from the image signals by a second interpolation method that is different from the first interpolation method in cases where it is judged that the interpolation precision is insufficient.

31. A method, for an image pickup system, for processing an image signal at each pixel which comprises a plurality of color signals, wherein the image pickup system comprises an image pickup element which outputs an image signal for each pixel from which one or more of the color signals are dropped out according to the location of the pixel, the method comprising:

separating, by a separating unit of the image pickup system, the image signals into first image signals and second image signals based on predetermined characteristics relating to the image signals;

interpolating, by a first interpolating unit of the image pickup system, the color signals dropped-out from the first image signals by a first interpolation method;

interpolating, by a second interpolating unit of the image pickup system, the color signals dropped-out from the second image signals by a second interpolation method that is different from the first interpolation method;

verifying, by a verification unit of the image pickup system, the interpolation precision based on the first image signals and the color signals interpolated by the first interpolating unit for regions of the first image signals, and verifying, by the verification unit, the interpolation precision based on the second image signals and the color signals interpolated by the second interpolating unit for regions of the second image signals; and causing, by an adjustment unit of the image pickup system, interpolation processing of the dropped-out color signals to be performed again by the second interpolating unit when insufficient interpolation was performed by the first interpolating unit, and causing, by the adjustment unit, interpolation processing of the dropped-out color signals to be performed again by the first interpolating unit when insufficient interpolation was performed by the second interpolating unit, in cases where it is judged that the interpolation precision is insufficient.

32. A method, for an image pickup system, for processing, an image signal at each pixel which comprises a plurality of color signals, wherein the image pickup system comprises an image pickup element which outputs an image signal for each pixel from which one or more of the color signals are dropped out according to the location of the pixel, the method comprising:

interpolating, by a first interpolating unit of the image pickup system, the color signals dropped-out from the image signals by a first interpolation method;

interpolating, by a second interpolating unit of the image pickup system, the color signals dropped-out from the image signals by a second interpolation method that is different from the first interpolation method;

verifying, by a verification unit of the image pickup system, the interpolation precision based on the color signals, the color signals being interpolated by the first interpolating unit and by the second interpolating unit; and selecting, by a selection unit of the image pickup system, color signals that have a higher interpolation precision between the color signals that are interpolated by the first interpolating unit and the color signals that are interpolated by the second interpolating unit.

* * * * *